US012537386B2

(12) United States Patent
Oguro

(10) Patent No.: US 12,537,386 B2
(45) Date of Patent: Jan. 27, 2026

(54) STORAGE APPARATUS, POWER SUPPLYING METHOD, AND PROGRAM

(71) Applicant: Hitachi Vantara, Ltd., Yokohama (JP)

(72) Inventor: Ryohei Oguro, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/822,605

(22) Filed: Sep. 3, 2024

(65) Prior Publication Data

US 2025/0279670 A1 Sep. 4, 2025

(30) Foreign Application Priority Data

Mar. 4, 2024 (JP) ................................. 2024-031891

(51) Int. Cl.
*H02J 9/06* (2006.01)
*H02J 7/00* (2006.01)

(52) U.S. Cl.
CPC .............. *H02J 9/06* (2013.01); *H02J 7/0063* (2013.01)

(58) Field of Classification Search
CPC .................................. H02J 9/06; H02J 7/0063

USPC .......................................................... 307/66
See application file for complete search history.

(56) References Cited

U.S. PATENT DOCUMENTS

| 2014/0173310 | A1 | 6/2014 | Tsuji et al. | |
| 2015/0214771 | A1* | 7/2015 | Peterson | G06F 1/263 |
| | | | | 307/20 |
| 2020/0133361 | A1* | 4/2020 | Jenne | G06F 1/3212 |

FOREIGN PATENT DOCUMENTS

JP 2014-120070 A 6/2014

* cited by examiner

*Primary Examiner* — Michael R. Fin
(74) *Attorney, Agent, or Firm* — MATTINGLY & MALUR, PC

(57) ABSTRACT

Provided is a storage apparatus in which of power stored by a battery, surplus power can be effectively used for a monitoring device in normal operation. A storage apparatus includes a power assist controller that monitors the load of a monitoring device selected as a power assist target device. The power assist controller has: a monitoring unit that monitors the load of the monitoring device; and an assist unit that assists the monitoring device by supplying surplus power to the monitoring device until the load becomes a load threshold value or less when the surplus power remains in a battery and the load exceeds the load threshold value.

3 Claims, 21 Drawing Sheets

FIG. 1
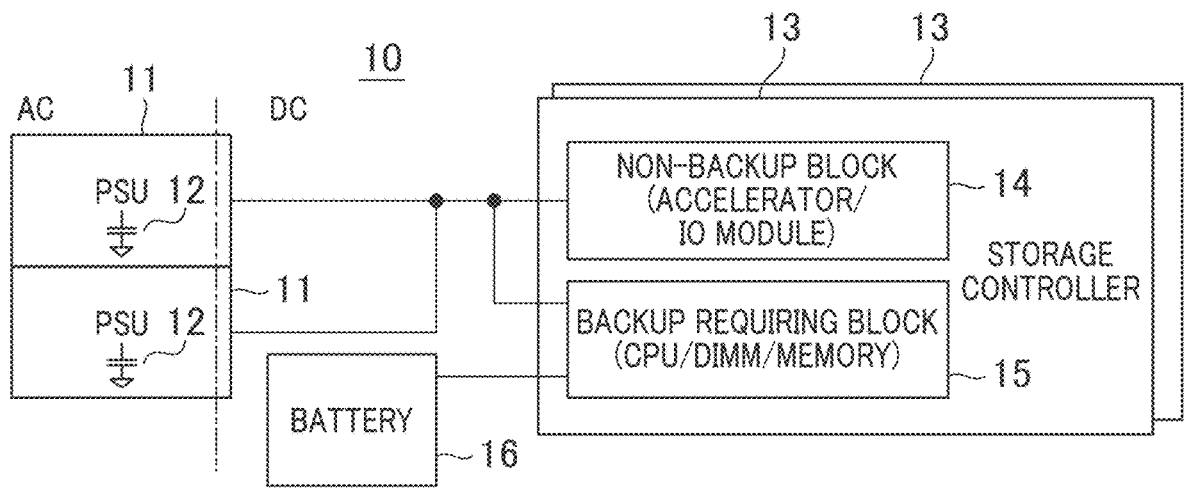
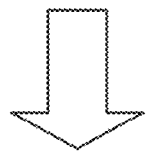
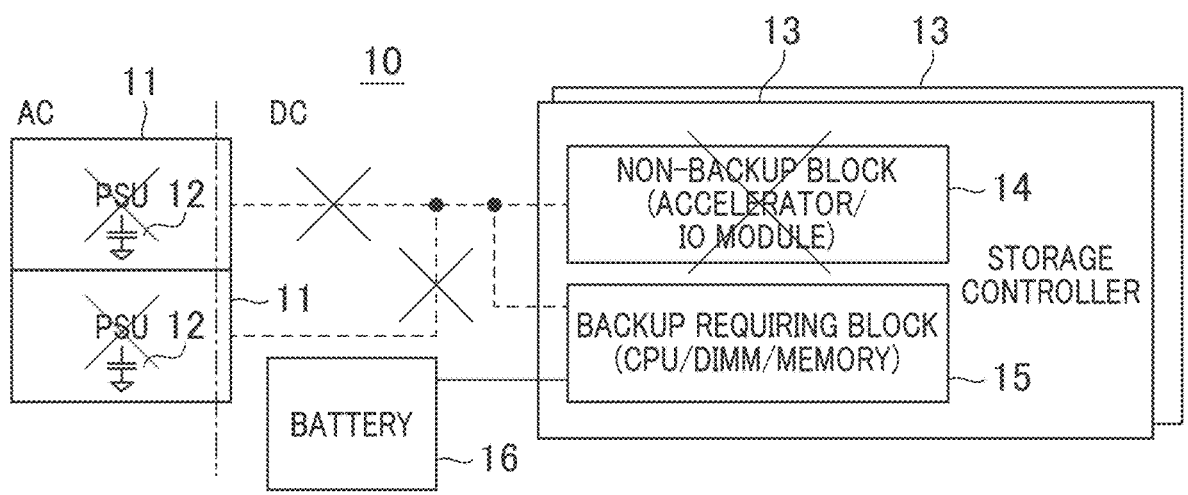
PRIOR ART

FIG. 7

T1 PER-DEVICE CHANGING EFFECT LISTING TABLE

| PORTION | JUDGING ITEM | CHANGING METHOD | PORTION EFFECT | EFFECT TO USER |
|---|---|---|---|---|
| CPU | CPU USAGE RATE | OVERCLOCK | CPU PROCESSING ABILITY IS IMPROVED | PP PROCESSING SPEED IS IMPROVED TRANSACTION PROCESSING SPEED IS IMPROVED |
| DIMM | DIMM USAGE RATE | DIMM OVERCLOCK | DIMM TRANSFER ABILITY IS IMPROVED | PP PROCESSING SPEED IS IMPROVED TRANSACTION PROCESSING SPEED IS IMPROVED |
| ENCRYPTION FPGA | DRIVE USAGE RATE DRIVE OPERATION RATE DIMM USAGE RATE | FPGA POWER MANAGEMENT IS CHANGED | FPGA PROCESSING ABILITY IS IMPROVED | ENCRYPTION PROCESS IS IMPROVED |
| COMPRESSION FPGA | DRIVE USAGE RATE DRIVE OPERATION RATE DIMM USAGE RATE | FPGA POWER MANAGEMENT IS CHANGED | FPGA PROCESSING ABILITY IS IMPROVED | COMPRESSION AND DECOMPRESSION PROCESSES ARE IMPROVED LATENCY IS IMPROVED |
| SMART NIC | BANDWIDTH USAGE RATE TRAFFIC AMOUNT CPU USAGE RATE MEMORY USAGE RATE | SEMICONDUCTOR OVERCLOCK DIMM OVERCLOCK | PERFORMANCE OF OFFLOAD IS IMPROVED | PP PROCESSING SPEED IS IMPROVED NETWORK TRANSFER SPEED IS IMPROVED |
| BE SWITCH | DRIVE OPERATION RATE LATENCY BUSY RATE | BE PCIe LINK SPEED | DRIVE TRANSFER SPEED IS IMPROVED | BACKUP SPEED IS IMPROVED RECOVERY SPEED IS IMPROVED (FALLBACK TIME IS SHORTENED) |
| FAN | TEMPERATURE SENSOR VALUE | NUMBER OF ROTATIONS OF FAN IS INSTRUCTED (PWM) | COOLING ABILITY IS IMPROVED | COOLING ABILITY IS OPTIMIZED LIFETIME OF PART IS IMPROVED |

FIG. 8

T2 ASSIST TARGET DEVICE LISTING TABLE

| DEVICE | ASSIST EFFECT |
|---|---|
| SMART NIC | CLOCK SCALING: BY DYNAMICALLY REGULATING CLOCK SPEED OF SEMICONDUCTOR PROCESSOR, POWER EFFICIENCY CAN BE OPTIMIZED WITH NECESSARY PERFORMANCE BEING MAINTAINED ACCORDING TO REQUIREMENT OF WORKLOAD |
| CPU | TURBO BOOST: BY TURBO BOOST FUNCTION THAT TEMPORARILY INCREASES CLOCK SPEED WHEN LOAD IS HIGH, TASK PROCESSING SPEED CAN BE IMPROVED |
| GPU | GPU BOOST: BY GPU BOOST FUNCTION THAT AUTOMATICALLY REGULATES CLOCK SPEED WHEN LOAD IS HIGH, PERFORMANCE CAN BE IMPROVED IN WORK HAVING HIGH REQUEST |
| MEMORY (RAM) | XMP (EXTREME MEMORY PROFILE): XMP IS PROFILE FOR IMPROVING PERFORMANCE OF MEMORY MODULE, AND BY USING OVERCLOCKED PROFILE THAT IS PREVIOUSLY SET BY MAKER, CLOCK SPEED OF MEMORY CAN BE INCREASED |
| SSD | SSD CACHE: TIME TO TAKE ACCESS IS SHORTENED BY CACHE, AND PERFORMANCE OF READING AND WRITING OF DATA IS IMPROVED |
| | INTERFACE OVERCLOCK: BY INCREASING OPERATION CLOCK OF IF BETWEEN NAND MEMORY AND NAND CONTROLLER, TRANSFER LATENCY IS IMPROVED |
| HDD | DISK CACHE: BY USING CACHE MEMORY IN DRIVE, PERFORMANCE OF READING AND WRITING CAN BE IMPROVED |
| BE SWITCH | LINK SPEED SWITCHING: WHEN DEVICE CONNECTED WITH EXPANDER SUPPORTS FUNCTION, SWITCHING TO HIGHER LINK SPEED IS PERFORMED BETWEEN BOTH DEVICES TO MAKE DATA TRANSFER FASTER |
| FAN | PWM (PULSE WIDTH MODULATION) CONTROL: BY CHANGING PULSE WIDTH OF POWER SUPPLIED TO FAN BY PWM CONTROL, ROTATION SPEED IS REGULATED, SO THAT NECESSARY COOLING EFFECT CAN BE SECURED |
| FPGA | OVERCLOCK (MEMORY MOUNTING) |

FIG. 9

T3 MODE MANAGEMENT TABLE

| OPERATION MODE | MONITORING DEVICE | MONITORING PARAMETER | WORKLOAD THRESHOLD VALUE | HYSTERESIS | BATTERY | CAPACITOR | CASE OF POWER FAILURE |
|---|---|---|---|---|---|---|---|
| BACKUP PRIORITIZATION | SMART NIC | OPERATION RATE | 80 | 10 | ON | OFF | N/A |
| BACKUP PRIORITIZATION | BE SWITCH | OPERATION RATE | 80 | 10 | ON | OFF | OR |
| BACKUP PRIORITIZATION | BE SWITCH | OPERATION RATE | 70 | 10 | ON | OFF | OR |
| IO PROCESS ASSIST | CPU | ... | ... | ... | ... | ... | ... |
| ... | ... | ... | ... | ... | ... | ... | ... |
| COOLING PRIORITIZATION | FAN | ... | ... | ... | ... | ... | ... |
| COMPRESSION ASSIST | BE SWITCH | ... | ... | ... | ... | ... | ... |
| ... | ... | ... | ... | ... | ... | ... | ... |
| FALLBACK MINIMIZATION | CPU | ... | ... | ... | ... | ... | ... |
| ... | ... | ... | ... | ... | ... | ... | ... |

FIG. 13

T4 POWER SUPPLY MANAGEMENT TABLE

| ID | POWER SUPPLY NAME | MODEL NUMBER | MAXIMUM POWER [W] | CHARGING TIME [H] | CURRENT POWER AMOUNT [W] | BACKUP POWER AMOUNT THRESHOLD VALUE [W] | CHARGING/ DISCHARGING CYCLE LIFETIME [NUMBER OF TIMES] | NUMBER OF TIMES OF CURRENT CHARGING/DISCHARGING [NUMBER OF TIMES] * ONLY BATTERY |
|---|---|---|---|---|---|---|---|---|
| PS1 | PSU | xxx | xx | xx | - | - | - | - |
| PS2 | BATTERY | xxx | xx | xx | xx | xx | xx | xx |
| PS3 | CAPACITOR | xxx | xx | xx | xx | xx | - | - |
| ... | ... | ... | ... | ... | ... | | | |

FIG. 15

T5 CONFIGURATION INFORMATION TABLE

| ID | DEVICE NAME | MODEL NUMBER | UNIT TIME POWER CONSUMPTION [w] (POWER CONSUMPTION AT ASSIST) |
|---|---|---|---|
| CP1 | CPU | xxx | xx |
| GP1 | GPU | xxx | xx |
| SD1 | SSD | xxx | xx |
| ... | ... | ... | ... |

FIG. 17

T6 MONITORING DEVICE TABLE

| ID | MONITORING DEVICE NAME | MODEL NUMBER | POWER CONSUMPTION [w] (POWER AT ASSIST) | WORKLOAD THRESHOLD VALUE | HYSTERESIS | CURRENT WORKLOAD VALUE |
|---|---|---|---|---|---|---|
| CP1 | CPU1 | xxx | Xx | Xx | Xx | Xx |
| CP2 | GPU2 | xxx | xx | Xx | Xx | Xx |
| DM1 | DIMM1 | xxx | xx | Xx | Xx | Xx |
| ⋮ | ⋮ | ⋮ | ⋮ | | | |

STORAGE APPARATUS, POWER SUPPLYING METHOD, AND PROGRAM

CROSS-REFERENCE TO RELATED APPLICATION

The present application claims priority from Japanese application JP2024-031891, filed on Mar. 4, 2024, the content of which is hereby incorporated by reference into this application.

BACKGROUND

This invention relates to a storage apparatus, a power supplying method, and a program.

Conventionally, a duplication configuration has been adopted for the power supply system of a storage for an enterprise (for example, for a corporation).

FIG. 1 is a schematic diagram illustrating the power supply system of a storage apparatus 10 in a related art.

The upper side of FIG. 1 illustrates a configuration and an operation example of the storage apparatus 10 in normal operation or in case of the instantaneous power failure.

The storage apparatus 10 is provided with PSUs (Power Supply Units) 11 being duplicated and to which an alternating current power supply is connected, storage controllers 13 being duplicated, and a battery 16 for backup. As the battery 16, for example, a nickel hydrogen battery is used. Each of the two PSUs 11 supplies, to the storage controller 13, direct current obtained by converting alternating current. The two PSUs 11 are operated in active balance, and are operated in parallel during the normal operation. The load of each PSU 11 is limited to 50% or less of the maximum load such that power has no problem even in single system operation.

Each PSU 11 is provided with a capacitor 12 that is an instantaneous power failure withstanding capacitor. In the normal operation, the PSU 11 converts power supplied from an external power supply to supply the power to the storage controller 13. Also in case of the instantaneous power failure, the PSU 11 performs the normal operation, and the storage apparatus 10 is not stopped. For that, the capacitor 12 including a large capacity aluminum electrolytic capacitor is mounted in the interior of the PSU 11, and withstands the instantaneous power failure. In case of the instantaneous power failure, power stored in the capacitor 12 is supplied to the storage controller 13.

The storage controller 13 includes a non-backup block 14, and a backup requiring block 15. The non-backup block 14 is configured of an accelerator, an IO (Input/Output) module, and the like, and does not back up a processing result. The backup requiring block 15 is configured of a CPU (Central Processing Unit), a DIMM (Dual Inline Memory Module), a memory, and the like, and is required to back up a processing result or user data. For this, the backup requiring block 15 is connected with the battery 16 for backup that can supply power in case of the power failure.

The lower side of FIG. 1 illustrates a configuration and an operation example of the storage apparatus 10 in case of the long time power failure.

Unlike the above instantaneous power failure, when the long time power failure occurs, input AC supplying alternating current power to the PSU 11 is lost, and the PSU 11 is stopped. Consequently, the power supplying from the PSU 11 to the storage controller 13 is stopped. Accordingly, power is supplied from the battery 16 disposed in parallel with the PSU 11 to the storage controller 13, and the storage controller 13 continues the operation. However, although each module of the non-backup block 14 may be stopped, the backup requiring block 15 is required to back up a processing result. Accordingly, the backup requiring block 15 is operated by the power supplied from the battery 16, and after the processing result of the CPU, data recorded to the DIMM, and the like are compared with the SSD, the storage apparatus 10 is stopped.

FIG. 2 is a diagram illustrating an example of the change in power supplied from the PSU 11 and the battery 16 in the related art. In FIG. 2, the horizontal axis indicates time, and the vertical axis indicates power.

The PSU supplying power indicates power obtained by adding the maximum powers of the two PSUs 11. The storage apparatus 10 performs the normal operation by the PSU supplying power until the power failure occurs. On the other hand, the battery supplying power indicates power supplied to the storage controller 13 by the battery 16. In the normal operation, the battery 16 is in standby state, and thus, the battery supplying power is almost zero.

When the power failure occurs, the PSU supplying power is lowered. When the storage controller 13 detects the occurrence of the power failure, the battery supplying power is increased by the control of the storage controller 13. Even when being switched to the operation of receiving the power supplying only from the battery 16, the storage controller 13 is required to allow the battery 16 to continue the power supplying until being switched to the power saving operation. For this, the battery 16 has large capacity and large output characteristics. The low power consumption operation is continued until the completion of the backup operation by the backup requiring block 15 after the detection of the power failure by the storage controller 13.

An example of such a power supplying apparatus is disclosed in Japanese Unexamined Patent Application Publication No. 2014-120070. Japanese Unexamined Patent Application Publication No. 2014-120070 discloses "an electronic apparatus comprising a connection detection unit detecting the connection of a first power supply and a second power supply; a power amount information acquiring unit acquiring total power amount information that can be supplied from the plurality of power supplies in which the connection is detected; and an instruction unit comparing power amount information used in the previously set high speed operation mode of a control unit and the total power amount information and instructing the control unit to operate in an operation mode in which power consumption is smaller when the power amount used in the high speed operation mode of the control unit is larger than the total power amount.

SUMMARY

By the way, the battery 16 illustrated in FIG. 1 is only used to protect the data of the backup requiring block 15 when the long time power failure occurs. In addition, as illustrated in FIG. 2, the battery 16 has the large capacity and large output characteristics for the data backup in case of the power failure. However, although in the normal operation, electricity is stored also in the battery 16, since the battery 16 is always in the standby state, the power of the battery 16 is not effectively used.

In addition, since the battery 16 has a lifetime, when the predetermined period elapses even if the battery 16 is not used, the battery 16 is required to be disposed of. On the other hand, the device mounted in the storage controller 13, such as the CPU, the accelerator, and the encryption module, requires more power as compared with conventional device types. However, the PSU supplying power has a limit based on the specifications of the PSU 11. By the limit of the PSU supplying power, the implementation number of functions that should be implemented in the storage apparatus 10 is also limited. In this way, the apparatus configuration of the storage apparatus 10 is also often changed on the basis of the power that can be supplied to the storage apparatus 10.

In the electronic apparatus disclosed in Japanese Unexamined Patent Application Publication No. 2014-120070, the power can be supplied from the plurality of power supplies according to the upper limit of the power consumption set by the turbo mode. However, Japanese Unexamined Patent Application Publication No. 2014-120070 does not describe the power supplying in case of the power failure, and in case of the power failure, the power is merely supplied from the battery. Consequently, even when the technique disclosed in Japanese Unexamined Patent Application Publication No. 2014-120070 is used, the problem that the power stored by the expensive battery 16 cannot be effectively used in the normal operation is not solved.

The invention has been made in view of such circumstances, and an object of the invention is to be able to effectively use an electricity storing unit also in normal operation.

A storage apparatus according to the invention includes a power control unit that monitors the load of a monitoring device selected as a power assist target device. The power control unit has: a monitoring unit that monitors the load of the monitoring device; and an assist unit that assists the monitoring device by supplying surplus power to the monitoring device until the load becomes a load threshold value or less when the surplus power remains in an electricity storing unit and the load exceeds the load threshold value.

According to the present invention, it is possible to effectively use an electricity storing unit also in normal operation.

Objects, configurations, and effects other than the above will be apparent from the description of the following embodiments.

BRIEF DESCRIPTION OF THE DRAWINGS

FIG. 1 is a schematic diagram illustrating the power supply system of a storage apparatus in a related art;

FIG. 7 is a diagram illustrating a configuration example of a per-device changing effect listing table according to one embodiment of the invention;

FIG. 8 is a diagram illustrating a configuration example of an assist target device listing table according to one embodiment of the invention;

FIG. 9 is a diagram illustrating a configuration example of a mode management table according to one embodiment of the invention;

FIG. 13 is a diagram illustrating a configuration example of a power supply management table according to one embodiment of the invention;

FIG. 15 is a diagram illustrating a configuration example of a configuration information table according to one embodiment of the invention;

FIG. 17 is a diagram illustrating a configuration example of a monitoring device table according to one embodiment of the invention;

DETAILED DESCRIPTION

Figure 2:
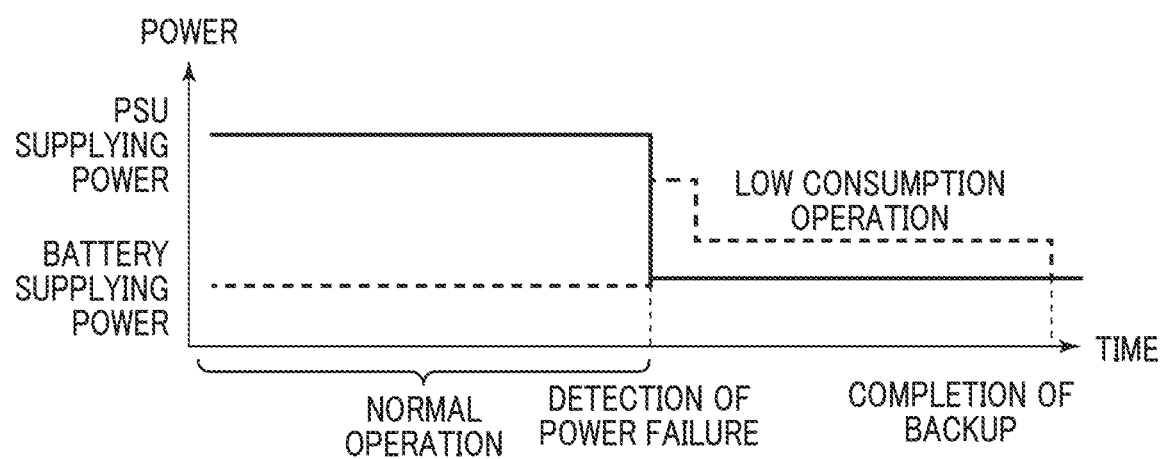
FIG. 2 is a diagram illustrating an example of the change in power supplied from a PSU and a battery in the related art.

One embodiment of the invention will now be described with reference to the drawings. In this specification and the drawings, components having substantially the same functions or configurations are indicated by the same reference numerals, and the overlapped description thereof is thus omitted. A storage apparatus described below is operated by a program that can execute a power supplying method controlling power supplying from an electricity storing unit to a monitoring device.

Embodiment

Figure 3:
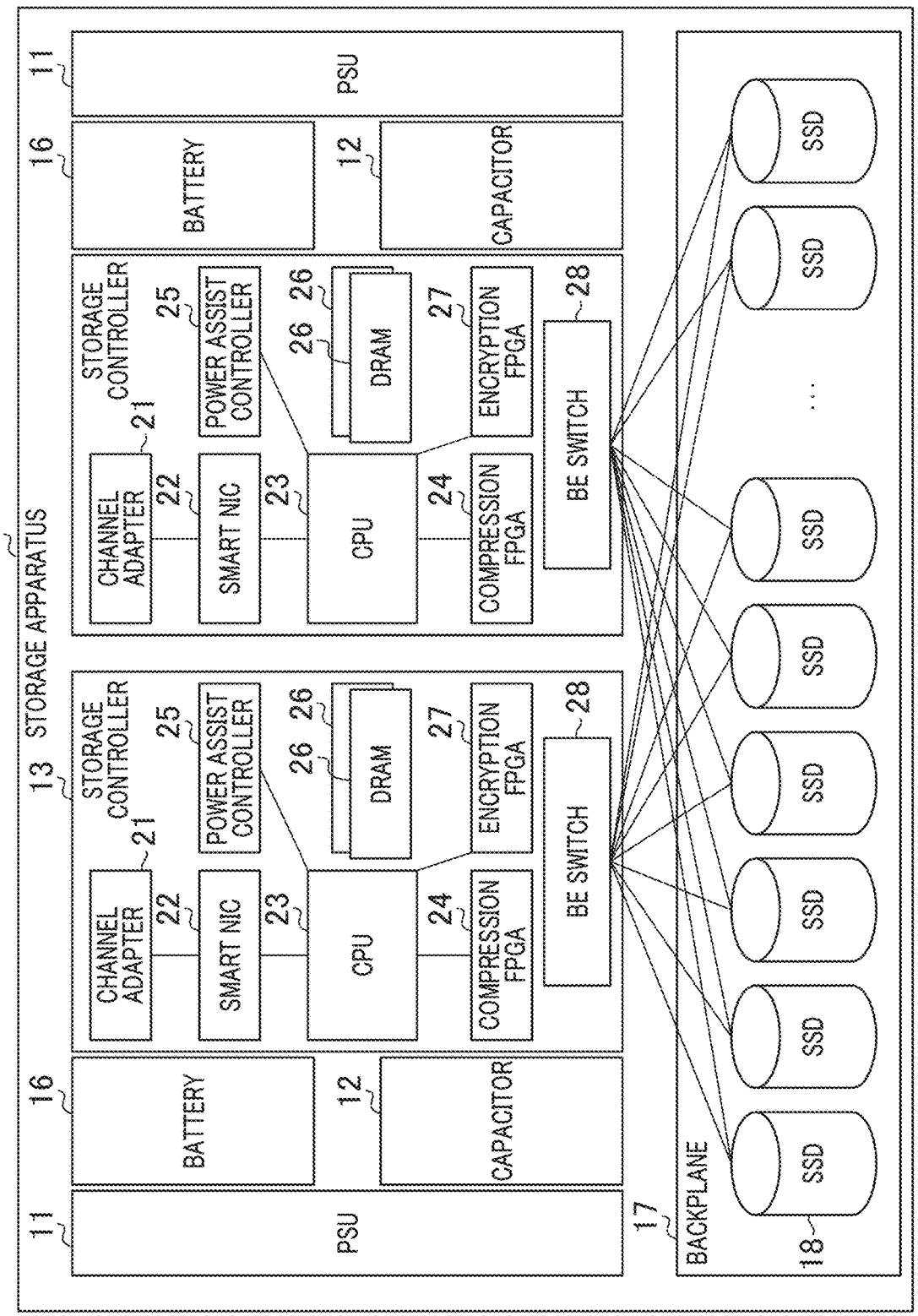
FIG. 3 is a block diagram illustrating a hardware configuration example of a storage apparatus according to one embodiment of the invention.

FIG. 3 is a block diagram illustrating a hardware configuration example of a storage apparatus 10 according to one embodiment.

The storage apparatus 10 according to one embodiment to which the invention is applied has an operation mode required by the storage apparatus 10, and performs the power supplying control to the monitoring device associated with the operation mode. That is, in one embodiment of the invention, the power supplying controls can be performed together with respect to a plurality of storage apparatuses 10 accommodated in a rack by using electricity storing means in the rack. For that, the invention is applicable also to a data storage center.

The monitoring device is a device selected as the monitoring target of a workload (also called a load). The monitoring device can improve some performance by, in addition to power supplied in normal operation, power additionally supplied when the workload exceeds a workload threshold value. In this way, the operation in which the power is additionally supplied to the monitoring device being overloaded is called power assist.

The storage apparatus 10 includes a large number of devices in a storage housing. As illustrated in FIG. 3, the storage apparatus 10 includes a capacitor 12, a storage controller 13, a battery 16, and a backplane 17. A PSU 11, the capacitor 12, the storage controller 13, and the battery 16 are made redundant by a duplication configuration. The capacitor 12 and the battery 16 are an example of an electricity storing unit storing surplus power. Note that the battery 16 also stores backup power used for the backup of the device in case of the power failure, in addition to the surplus power.

The storage controller 13 includes a channel adapter 21, a smart NIC (Network Interface Card) 22, a CPU 23, a compression FPGA (Field Programmable Gate Array) 24, a power assist controller 25, a plurality of DRAMs (Dynamic Random Access Memories) 26, an encryption FPGA 27, and a BE (Back End) switch 28.

The channel adapter 21 is used for connecting the storage controller 13 to other devices (for example, a front-end server), and provides a communication interface such as a fibre channel or iSCSI. The smart NIC 22 is an interface board connected to the CPU 23 and having a function of offloading a network interface process from the CPU 23. The smart NIC 22 offloads the load of the CPU 23, thereby not occupying the resource of the CPU 23 itself.

The CPU 23 controls the operation of each device in the storage controller 13. The power assist controller 25 is an example of a power control unit that monitors the load of the monitoring device selected as a power assist target device. The power assist controller 25 can serve as one function of the storage controller 13, and can also be a dedicated controller. The power assist controller 25 is used as an example of the power control unit monitoring the load of the monitoring device selected as the power assist target device, and supplying the surplus power of the electricity storing unit to the monitoring device when the load exceeds the load threshold value. The power assist controller 25 has various tables described with reference to FIG. 7 and the subsequent drawings in a memory, not illustrated, configured in the storage controller 13, and can write and read data to and from the tables. The memory used by the power assist controller 25 is used as an example of a non-transitory storage medium that can be read by the computer storing the program executed by the power assist controller 25.

The DRAM 26 is an example of a volatile memory. To prevent data loss, periodic data rewriting is required for the DRAM 26.

The backplane 17 is a type of circuit substrate, and is equipped with a plurality of SSDs 18. Since the SSD 18 is a non-volatile memory, data that is written once is not lost. Each SSD 18 is connected to the BE switch 28, and the CPU 23 can write or read data to or from the SSD 18. Note that when the CPU 23 writes data to the SSD 18, the data is compressed by the compression FPGA 24. In addition, the data can also be encrypted by the encryption FPGA 27.

Figure 4:
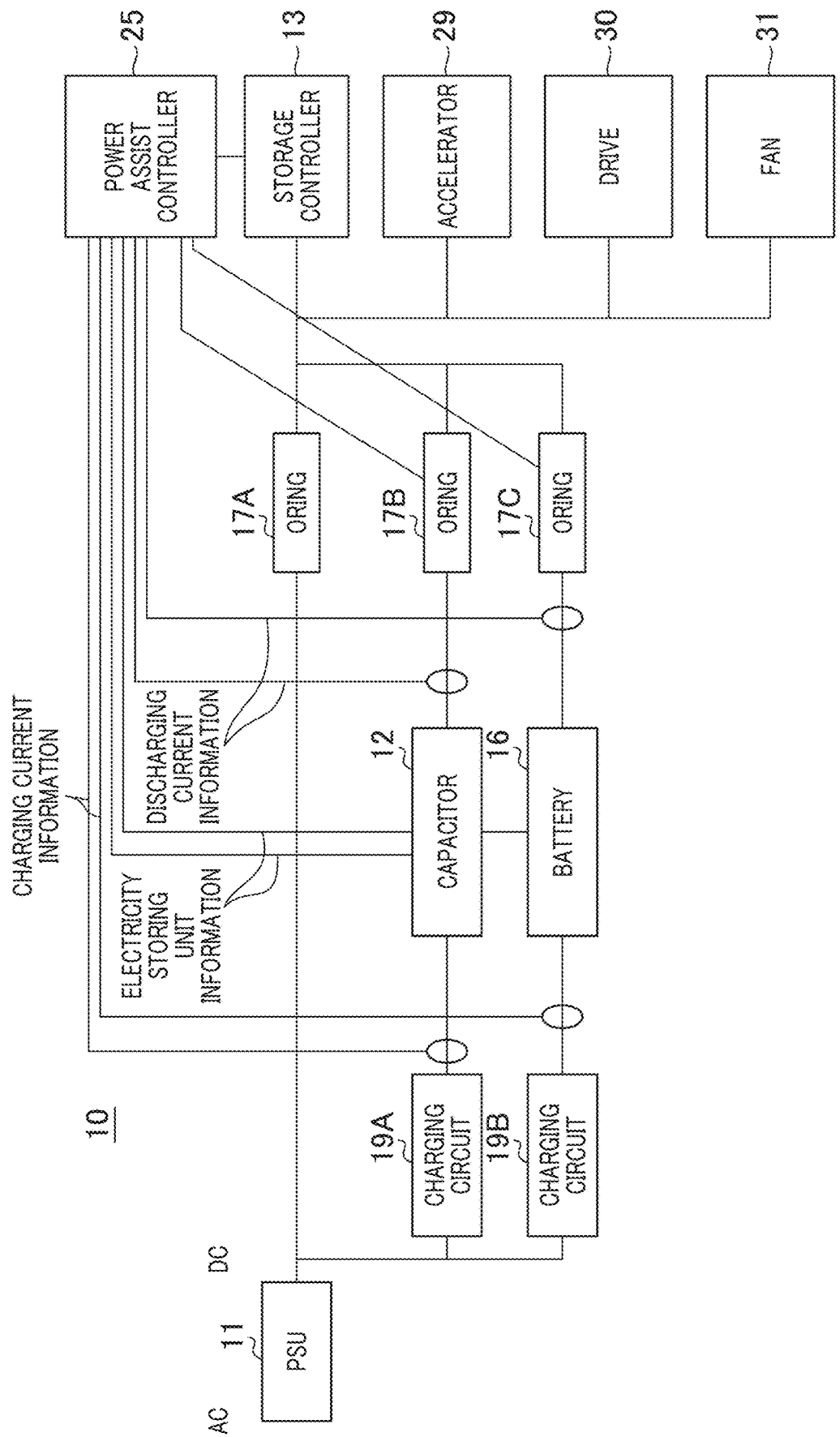
FIG. 4 is a system configuration diagram illustrating an example of the power supply system of the storage apparatus according to one embodiment of the invention.

FIG. 4 is a system configuration diagram illustrating an example of the power supply system of the storage apparatus 10. The system configuration diagram illustrated in FIG. 4 illustrates a hardware configuration representing the power supplying flow in the storage apparatus 10. The storage controller 13 includes the CPU 23 and the like used in the internal process of the storage apparatus 10, and is operated by the incorporated OS (Operating System). The system configuration of the storage apparatus 10 is assembled according to the request of a user.

The PSU 11 supplies direct current obtained by AC/DC converting alternating current to the storage controller 13, an accelerator 29, a drive 30, and a fan 31. The accelerator 29 has a function of reducing (offloading) the load of the CPU 23 illustrated in FIG. 3. The drive 30 also includes an HDD, not illustrated, in addition to the SSD 18 illustrated in FIG. 3.

The output side of the PSU 11 is connected with the capacitor 12 via a charging circuit 19A, and is connected with the battery 16 via a charging circuit 19B. The capacitor 12 and the battery 16 are connected in parallel. The charging circuit 19A to which power is supplied from the PSU 11 charges the capacitor 12 in the normal operation. Likewise, the charging circuit 19B to which power is supplied from the PSU 11 charges the battery 16 in the normal operation. As the battery 16, for example, an on-board lithium battery, a lithium ion phosphate battery, an all-solid-state battery, a lithium air battery, and the like are used.

In the storage apparatus 10, ORing circuits 17A to 17C are installed. The ORing circuits 17A to 17C are an example of a power control element controlling the power flow. As the ORing circuits 17A to 17C, ideal diodes configuring wired OR are used. The current supplying of the capacitor 12 and the battery 16 is controlled by the ORing circuits. In addition, the on or off of the ORing circuits 17A to 17C is controlled by the power assist controller 25. Note that the on of the ORing circuits 17A to 17C means current passing, and the off of the ORing circuits 17A to 17C means interruption.

The ORing circuit 17A is installed between the PSU 11 and the storage controller 13. Likewise, the ORing circuit 17B is installed between the capacitor 12 and the storage controller 13, and the ORing circuit 17C is installed between the battery 16 and the storage controller 13. In the ORing circuit 17A, the flow control is performed by the PSU 11. In the ORing circuits 17B, 17C, the flow control is performed by the power assist controller 25.

When the workload of the monitoring target device exceeds the workload threshold value, the power assist controller 25 increases the processing performance of the device by the power assist that supplies the surplus power of the battery 16 to the device. For this, the power assist controller 25 acquires charging current information between the PSU 11 and the capacitor 12. Likewise, the power assist controller 25 acquires charging current information between the PSU 11 and the battery 16. In addition, the power assist controller 25 acquires discharging current information between the capacitor 12 and the ORing circuit 17B. Likewise, the power assist controller 25 acquires discharging current information between the battery 16 and the ORing circuit 17C. In addition, the power assist controller 25 acquires respective electricity storing unit information from the capacitor 12 and the battery 16. The electricity storing unit information includes information on a capacitor voltage, a battery voltage, and a capacity.

The storage controller 13 issues a power assist request to the power assist controller 25. In the issuing of the power assist request, for example, apparatus configuration information, the implementation state of PP (Program Products) as part of a software function, a task manager, and an input/output execution amount are referred. Note that the apparatus configuration information means a replaceable unit (FRU: Field replaceable unit) targeting part of the device mounted in the storage apparatus 10. In addition, information regarding power consumed by each current device is outputted from the storage controller 13 to the power assist controller 25. The power assist controller 25 can calculate the workload of each device on the basis of this information, and can instruct the storage controller 13 to perform the power assist with respect to the device whose workload is higher than the workload threshold value.

The ORing circuits 17B, 17C are used for the power control at executing the power assist by the storage controller 13, and the flow control of power supplied to the device is performed. When the storage controller 13 performs the power assist, the charging to the capacitor 12 and the battery 16 by the charging circuits 19A, 19B is stopped, and the ORing circuits 17B, 17C are controlled to supply power stored by the capacitor 12 or the battery 16 to the device.

The storage controller 13 manages the surplus power of the battery 16 on the basis of the electricity storing unit information acquired from the power assist controller 25, and controls the power amount supplied to each SSD 18 of the backplane 17 on the basis of whether or not the power assist by the power assist controller 25 is required. The storage apparatus 10 can automatically control the power supply and demand balance in each device. In addition, in case of the instantaneous power failure, power is supplied from the capacitor 12, and in case of the power failure, power is requested from the battery 16. In addition, also in the normal operation, when the performance is temporarily increased in various devices, power stored in the battery 16 is supplied. For this, the power supplying having a rated power or more of the PSU 11, that is, the power supplying for increasing the upper limit of the required power amount of the storage controller 13, the accelerator 29, and the like, can be performed.

In addition, the power assist controller 25 monitors the charging/discharging amount of the battery 16, and thus precisely recognizes the remaining amount information of the battery 16. For example, when a differential backup task is performed at a constant timing, the power assist controller 25 manages the charging amount of the battery 16 and the time to execute the power assist such that the power assist is performed at the timing at which the differential backup task is performed. For this, the power assist controller 25 can cause the battery 16 to hold power required for the backup by power supplied by the battery 16.

For example, when the recovery process of the drive 30 in which a malfunction has occurred is performed with the highest priority, the case of a load applying work and the like can be caused. In this case, the power assist controller 25 regulates the state of the battery 16 according to the power assist request, and manages the execution of the power assist.

Note that instead of the power assist controller 25, the storage controller 13 may serve as the above process by the power assist controller 25. In addition, the power assist controller 25 may be provided in the interior of the storage apparatus 10 to be separately from the storage controller 13.

Figure 5:
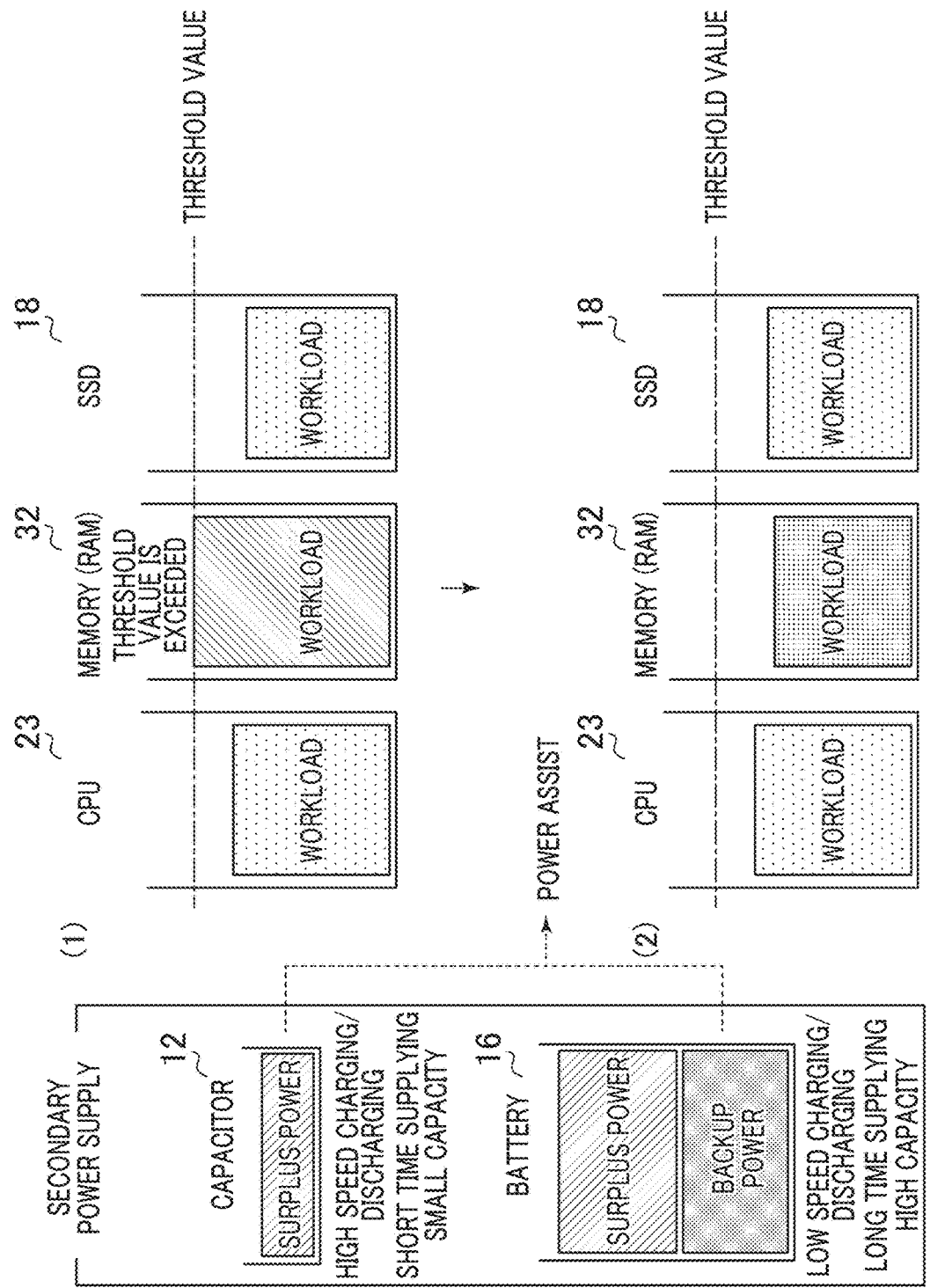
FIG. 5 is a diagram illustrating examples of the power supplying of a capacitor and a battery according to one embodiment of the invention.

FIG. 5 is a diagram illustrating examples of the power supplying of the capacitor 12 and the battery 16.

As illustrated on the left side of FIG. 5, the capacitor 12 and the battery 16 are provided, as secondary power supplies, in the storage apparatus 10. The capacitor 12 enables high speed charging/discharging, and can supply power only for a short time. However, the capacity that can be stored by the capacitor 12 is small. The capacitor 12 always stores only the surplus power, and does not store the backup power.

The battery 16 enables low speed charging/discharging, and can supply power for a longer time as compared with the capacitor 12. In addition, the capacity that can be stored by the battery 16 is large. For this, the battery 16 stores more surplus power and backup power than the capacitor 12.

The right side of FIG. 5 illustrates examples of the workloads of the CPU 23, a memory (RAM) 32, and the SSD 18. Each device is provided with the threshold value of the workload. The threshold value of the workload is a value when the maximum performance of each device is exhibited, and is controlled such that the workload does not exceed the threshold value.

Example (1) of the workload of FIG. 5 illustrates a state where the workload of the memory (RAM) 32 exceeds the threshold value. In this case, the power assist controller 25 first confirms the presence or absence of the surplus power on the basis of the power amount stored by the secondary power supply. Next, the power assist controller 25 roughly estimates the power consumption amount of each device. For example, the power consumption amount per second is roughly estimated. Next, the power assist controller 25 judges, from the secondary power supply, whether or not the power supplying to the device whose workload exceeds the threshold value is enabled, and the power supplying time (called boost time).

Example (2) of the workload of FIG. 5 illustrates a state where the memory (RAM) 32 is subjected to the power assist by the power assist controller 25 and the workload thus becomes less than the threshold value. The power assist controller 25 performs control such that the power from the secondary power supply is supplied to the memory (RAM) 32, so that the processing amount per unit time of the memory (RAM) 32 is improved. As a result, the workload of the memory (RAM) 32 is changed to be less than the threshold value.

Besides, the power from the secondary power supply is supplied, so that the effects of the improvement in the data transfer speed of the memory (RAM) 32, the improvement in the access speed of the memory (RAM) 32, and the like are expected. In addition, the workload of the CPU 23 exceeds the workload threshold value, so that when the CPU 23 is subjected to the power assist, the number of processing commands per unit time is increased by the overclock of the CPU 23, and the effect of the improvement in performance and processing speed is expected.

Note that in consideration of the characteristics of the capacitor 12 and the battery 16, power supplying destinations may be divided. For example, in consideration of the high speed charging/discharging of the capacitor 12, the surplus power of the capacitor 12 is first supplied to the monitoring device with priority, so that the power assist by the power assist controller 25 can be performed at higher speed.

Figure 6:
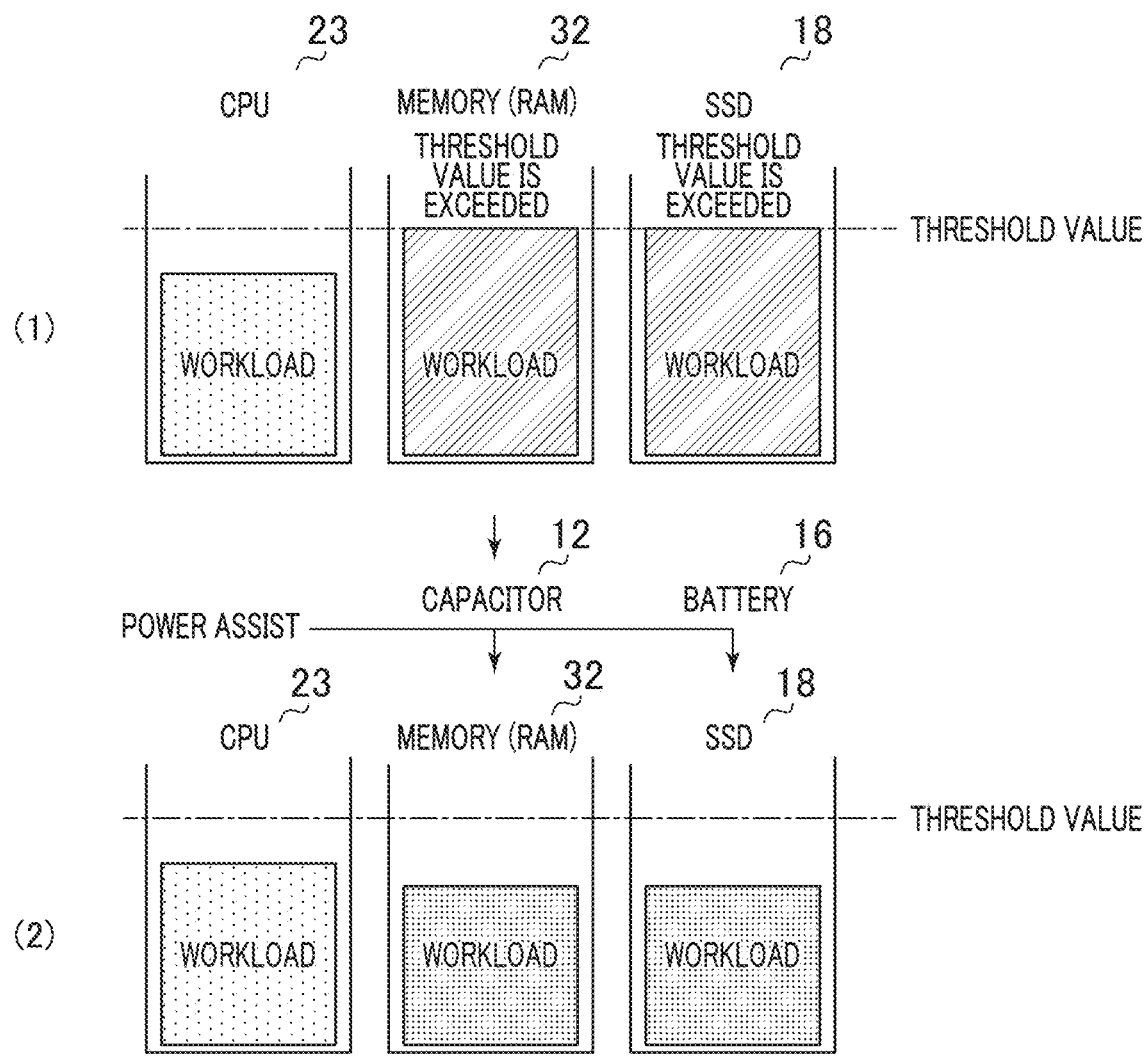
FIG. 6 is a diagram illustrating an example in which power supplying destinations are divided according to the characteristics of the capacitor and the battery according to one embodiment of the invention.

FIG. 6 is a diagrams illustrating an example in which the power supplying destinations are divided according to the characteristics of the capacitor 12 and the battery 16.

Example (1) of the workload of FIG. 6 illustrates a state where the workloads of the memory (RAM) 32 and the SSD 18 exceed the threshold values. Since the workloads of the two devices exceed the threshold values, the power is controlled to be supplied from the different secondary power supplies to the two devices.

Example (2) of the workload of FIG. 6 illustrates a state where the workloads of the memory (RAM) 32 and the SSD 18 become less than the threshold values. The power assist controller 25 supplies, to the memory (RAM) 32, power stored by the capacitor 12, and supplies, to the SSD 18, power stored by the battery 16. As a result, the workload of the memory (RAM) 32 is changed to be less than the threshold value. In the memory (RAM) 32, the effect of the improvement in performance by the overclock is expected, and in the SSD 18, the effect of the improvement in performance by the write cache is expected.

FIG. 7 is a diagram illustrating a configuration example of a per-device changing effect listing table T1.

The per-device changing effect listing table T1 has the items of the portion, the judging item, the changing method, the portion effect, and the effect to the user. Note that the monitoring device is registered to a monitoring device table T6 of FIG. 17 described later. The storage apparatus 10 is configured of the CPU, the DIMM, the encryption FPGA, the compression FPGA, the smart NIC, the BE switch, and the fan, which are each recorded to the item of the portion of the per-device changing effect listing table T1 illustrated in FIG. 7. In addition, the storage apparatus 10 also includes the storage controller 13, the accelerator 29, and the drive 30 illustrated in FIG. 4.

In the item of the portion, the name of each of the CPU, the DIMM, the encryption FPGA, the compression FPGA, the smart NIC, the BE switch, and the fan, which are illustrated in FIG. 3 and the configuring portions of the storage apparatus is stored.

In the item of the judging item, information for judging that the workload of each portion is the workload threshold value or more is stored as the judging item. For example, in the case of the CPU 23, the CPU usage rate is the judging item. In the case of the encryption FPGA 27, the drive usage rate and the drive operation rate are the judging item. Note that the drive usage rate represents a usage rate with respect to the entire drive, and the drive operation rate represents a reading or writing rate with respect to the drive.

In the item of the changing method, for example, when the judging item exceeds the threshold value, the operation of the portion changed by the power assist is represented. For example, when the CPU usage rate exceeds the threshold value, the overclock of the CPU 23 is performed. When the drive usage rate or the drive operation rate of the encryption FPGA 27 exceeds the threshold value, the FPGA power management is changed.

In the item of the portion effect, the portion effect obtained by changing the operation of the portion by the changing method is represented. For example, the CPU 23 is overclocked, so that the effect of improving the CPU processing ability is obtained. In addition, the FPGA power management of the encryption FPGA 27 is changed, so that the effect of improving the FPGA processing ability is obtained.

In the item of the effect to the user, the improving contents of the function provided to the user by the portion by the portion effect are represented. For example, the CPU processing ability is improved as the portion effect, and the software function (Program Products) can thus occupy the CPU 23, so that the PP processing speed is improved. In addition, the CPU processing ability is improved, so that the improvement in transaction processing speed can also be expected.

FIG. 8 is a diagram illustrating a configuration example of an assist target device listing table T2.

The assist target device listing table T2 has the items of the device name and the assist effect. The assist target device is the device that is selected from the per-device changing effect listing table T1 illustrated in FIG. 7 according to the operation mode to be the target of the power assist. The assist target device and the monitoring device described later have the same meaning.

In the item of the device name, the name of the assist target device, such as the smart NIC 22, the CPU 23, the SSD 18, the BE switch 28, and the FPGA (the compression FPGA 24 and the encryption FPGA 27), which are illustrated in FIG. 3 is stored. Further, in the item of the device name, the name of the assist target device, such as the GPU and the memory (RAM), in addition to the fan 31 illustrated in FIG. 4, is also stored.

In the item of the assist effect, the effect by being assisted when the workload of the monitoring device exceeds the workload threshold value is represented. In the item of the assist effect, the contents obtained by detailing the item of the portion effect of the per-device changing effect listing table T1 of FIG. 7 are stored. For example, the smart NIC 22 is assisted, so that the contents in which the clock scaling is enabled are represented. The clock scaling means a process by which by dynamically regulating the clock speed of the semiconductor processor, the power efficiency is optimized with the necessary performance being maintained according to the requirement of the workload. In addition, the contents in which the CPU 23 is assisted, so that the turbo boost is enabled are represented. The turbo boost is a function of temporarily increasing the clock speed when the load of the CPU 23 is high, and the turbo boost can improve the processing speed of the task by the CPU 23.

FIG. 9 is a diagram illustrating a configuration example of a mode management table T3.

The mode management table T3 has the items of the operation mode, the monitoring device, the monitoring parameter, the threshold value, the hysteresis, the battery, and the capacitor, and the case of the power failure.

In the item of the operation mode, the operation mode that can be selected by the user is stored. As one of the operation modes, for example, the backup prioritization is the operation mode for the smart NIC 22 to cause the SSD 18 to perform the backup prioritization process. Other than this, the selectable operation modes are as follows. The IO process assist is, for example, the operation mode for assisting the IO process of the SSD 18 in the process of the user with a large number of transactions. The cooling prioritization is, for example, the operation mode in which the fan 31 is rotated at high speed for forcibly cooling the CPU 23 operated in a state where the workload is high.

The compression assist is the operation mode for assisting the compression process of the compression FPGA 24 having a high worker node during the compression process. The fallback minimization is the operation mode for assisting a process by which when one of a plurality of drives is failed, the failed drive is replaced, and then, based on data distributed to and stored in the remaining drives, the data stored in each drive is rebuilt.

In the item of the monitoring device, the information of the device to which the operation mode can be set is stored. The monitoring device is, among the assist target devices illustrated in the assist target device listing table T2 of FIG. 8, the device selected according to the operation mode to be the workload monitoring target. For example, the operation mode of the backup prioritization is set to the smart NIC 22 and the BE switch 28. In the item of the monitoring parameter, the parameter to be monitored of the monitoring device is stored. For example, the operation rate is set, as the monitoring parameter, to each of the smart NIC 22 and the BE switch 28. In the item of the threshold value, the workload threshold value of the monitoring device is stored.

Figure 11:
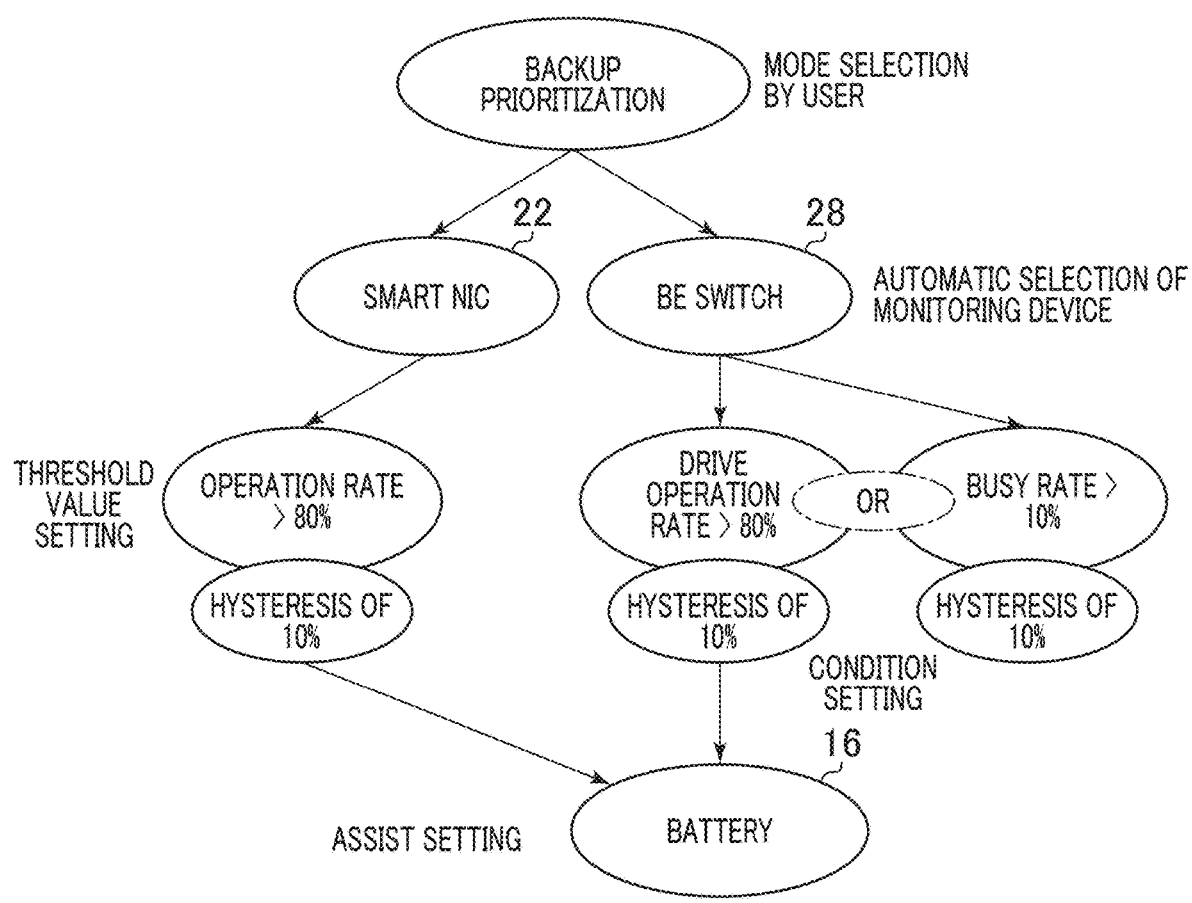
FIG. 11 is a flow diagram illustrating an operation example of the monitoring devices and an assist device according to the operation mode selected by the user according to one embodiment of the invention.

In the item of the hysteresis, the hysteresis of the monitoring device is stored. When the workload of the monitoring device exceeds the workload threshold value, the monitoring device is subjected to the power assist. However, the hysteresis is used in order that the power assist is not immediately stopped even when the workload becomes the workload threshold value or less. For example, when the operation rate of the monitoring device (smart NIC 22) as illustrated in FIG. 11 described later becomes 81% and the workload threshold value is 80%, the power assist is started.

Then, when by the power assist, the operation rate of the monitoring device becomes 79% and the power assist is stopped, the operation rate is likely to exceed 80% again. As a result, the on or off of the power assist is frequently repeated. Accordingly, the allowance of 10% is provided in the hysteresis, and until the operation rate of the monitoring device becomes 70% or less by the hysteresis, the power assist is continued. In this case, after the stop of the power assist, the operation rate of the monitoring device does not immediately exceed 80%. For this, the frequent on or off switching of the power assist is not performed.

In the item of the battery, whether or not the battery 16 can be used in case of the power failure is stored. When the battery 16 can be used in case of the power failure, ON is stored, and when the battery 16 cannot be used in case of the power failure, OFF is stored.

In the item of the capacitor, whether or not the capacitor 12 can be used in case of the power failure is stored. When the capacitor 12 can be used in case of the power failure, ON is stored, and when the capacitor 12 cannot be used in case of the power failure, OFF is stored.

In the item of the case of the power failure, whether or not the battery 16 and the capacitor 12 can be used in case of the power failure is stored. When both of the battery 16 and the capacitor 12 cannot be used in case of the power failure, "N/A (Not Available)" is stored. When one of the battery 16 and the capacitor 12 can be used in case of the power failure, "OR" is stored.

Figure 10:
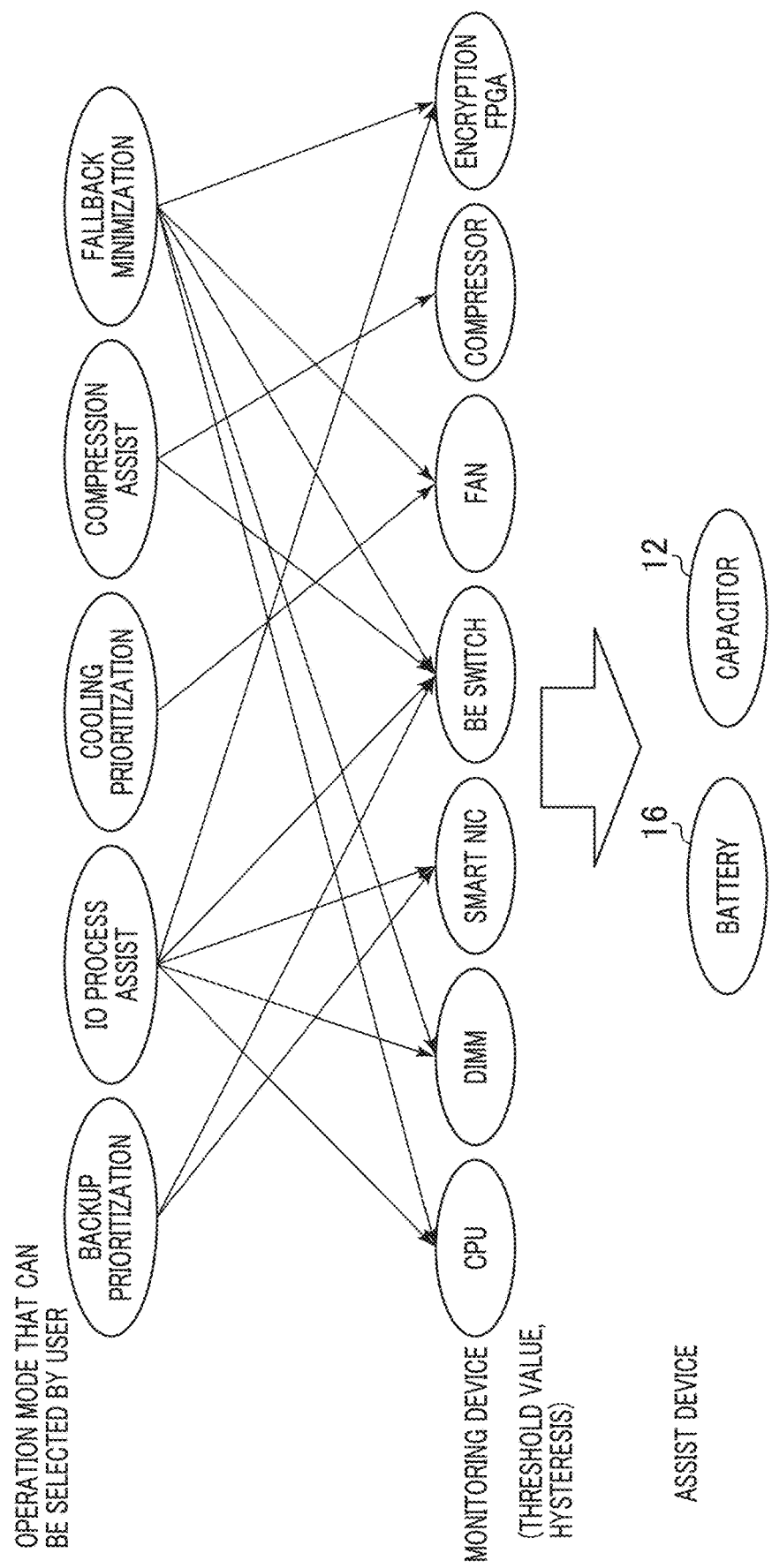
FIG. 10 is a concept diagram illustrating relationships between operation modes selected by a user and monitoring devices according to one embodiment of the invention.

FIG. 10 is a concept diagram illustrating relationships between the operation modes that can be selected by the user and the monitoring devices. The user is a person using the storage apparatus 10. Note that a movable mode that can be selected by, instead of the user, a system engineer operating and managing the storage apparatus 10 may be used.

It is difficult for the user to select which device is subjected to the power assist by the power assist controller 25. In addition, when the user is not a designer, it is difficult to designate the device related to various operation forms in the operation of the storage apparatus 10. Accordingly, the storage apparatus 10 selects the monitoring device to be autonomously subjected to the power assist on the basis of the operation mode selected by the user.

For example, as the operation modes that can be selected by the user of FIG. 10, the backup prioritization, the IO assist, the cooling prioritization, the compression assist, and the fallback minimization are present. In addition, as the monitoring devices, the CPU, the DIMM, the smart NIC, the BE switch, the fan, the compressor, and the encryption FPGA are present. The above threshold value and hysteresis are set to the monitoring device. Examples of the threshold value include a threshold value starting the power assist with respect to the monitoring device in which an assist device (for example, the battery 16 and the capacitor 12) is connected to the operation mode, and a threshold value in which the assist device ends the power assist.

For the backup prioritization that is one of the operation modes, the smart NIC and the BE switch are connected as the monitoring devices.

The lower side of FIG. 10 illustrates, as an example of the assist device, the battery 16 and the capacitor 12. The assist device supplies the surplus power to the monitoring device to subject the operation of the monitoring device to the power assist.

When the user selects the backup prioritization, the smart NIC and the BE switch that are the monitoring devices, the threshold values, and the hysteresises are selected according to the backup prioritization, and the assist device is set. The smart NIC and the BE switch are operated, so that the backup prioritization can be executed.

FIG. 11 is a flow diagram illustrating an operation example of the monitoring devices and the assist device according to the operation mode selected by the user.

As described above, when the user selects the backup prioritization, the smart NIC 22 and the BE switch 28 are automatically selected as the monitoring devices.

Next, the smart NIC 22 and the BE switch 28 associated with the backup prioritization are automatically selected as the monitoring devices.

For the threshold value of the smart NIC 22, 80% is set to the operation rate, and 10% is set to the hysteresis.

For the threshold value of the BE switch 28, the following two conditions are associated by OR. The first condition is that the BE switch 28 has the drive operation rate exceeding 80%, and the hysteresis of 10%. In addition, the second condition is that the BE switch 28 has the busy rate exceeding 10%, and the hysteresis of 10%. After one of the conditions is set, the assist setting is performed with respect to the battery 16. When at least one of the first condition and the second condition is satisfied, an assist unit 44 illustrated in FIG. 12 performs the power assist to the BE switch 28 by the battery 16.

Figure 12:
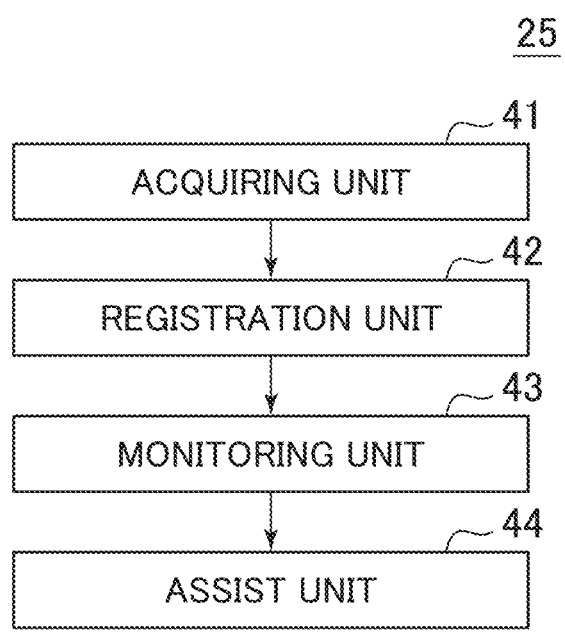
FIG. 12 is a block diagram illustrating a function configuration example of a power assist controller according to one embodiment of the invention.

FIG. 12 is a block diagram illustrating a function configuration example of the power assist controller 25.

The power assist controller 25 includes an acquiring unit 41, a registration unit 42, a monitoring unit 43, and the assist unit 44.

The acquiring unit 41 acquires information managed by the storage apparatus 10. For example, the acquiring unit 41 acquires the configuration information of the device configuring the storage apparatus 10 from a configuration information table T5 illustrated in FIG. 15 described later. The acquiring unit 41 can also access various tables to acquire necessary information from the tables.

The registration unit 42 registers various information acquired by the acquiring unit 41 to the table corresponding to the information. For example, the registration unit 42 registers, to the monitoring device table T6 illustrated in FIG. 17 described later, the information of the monitoring device selected from the configuration information table T5 based on the configuration information of the device acquired by the acquiring unit 41. At this time, the registration unit 42 registers a plurality of monitoring devices to the monitoring device table T6 according to the operation mode previously selected by the user and the like.

The monitoring unit 43 monitors the workload (load) of the monitoring device. For this, the monitoring unit 43 selects the plurality of monitoring devices according to the previously selected mode. The monitoring unit 43 monitors the workloads of the plurality of monitoring devices read from the monitoring device table T6 according to the selected operation mode.

The assist unit 44 supplies the surplus power to the monitoring device until the workload becomes the workload threshold value or less when the surplus power remains in the battery 16 and the workload exceeds the workload threshold value. In this way, the operation in which the assist unit 44 lowers the workload of the monitoring device whose workload exceeds the threshold value is called power assist. Note that when the capacitor 12 having a large capacity is used, the assist unit 44 can also supply the surplus power of the capacitor 12 to the monitoring device. The power assist by the assist unit 44 is indirectly performed in such a manner that the assist unit 44 outputs an instruction to the storage controller 13. The storage controller 13 that has received the instruction supplies the surplus power of the battery 16 to the monitoring device whose workload exceeds the workload threshold value, and performs the operation of lowering the workload of the monitoring device. This is ditto for the following process by which the assist unit 44 supplies the surplus power to the monitoring device.

The assist unit 44 supplies the surplus power to the monitoring device selected according to the characteristic of the electricity storing unit. For this, the assist unit 44 supplies, to the monitoring device, the surplus power of the capacitor 12 and the battery 16 selected according to the characteristics of the capacitor 12 and the battery 16 by the on or off of the ORing circuits 17B, 17C provided to the power supply wires between the capacitor 12 and the battery 16 and the monitoring device. For example, the assist unit 44 supplies the surplus power of the capacitor 12 as an example of the electricity storing unit enabling the high speed charging/discharging to the power assist to the monitoring device in the instantaneous power failure. On the other hand, the assist unit 44 supplies, to the monitoring device in the long period power failure, the surplus power of the battery 16 as an example of the electricity storing unit enabling the large capacity and low speed charging/discharging.

In addition, the assist unit 44 can also collectively supply the surplus power to the plurality of monitoring devices collected according to the selected operation mode. For this, the abrupt operation stop of the plurality of monitoring devices suitable for the operation mode can be prevented. Note that the assist unit 44 can also select, from the plurality of monitoring devices, the monitoring device to which the surplus power is supplied, according to the state of the workload of the monitoring device. For this, the assist unit 44 can perform control to supply the surplus power only to the monitoring device whose workload exceeds the workload threshold value among the plurality of monitoring devices collected according to the operation mode.

Here, the terms regarding the power amount used in this specification will be described.

The backup power amount [w] is the power amount of power necessary for the saving, that is, the backup, of SM data or CM data in case of the power failure. Note that the SM is the abbreviation of Shared memory, and represents a memory region shard between a plurality of applications. The CM is the abbreviation of Cache memory, and represents a memory for primarily holding data. The data held in the CM is shifted to the drive according to the processing flow.

The current power amount [w] is a power amount currently charged to the secondary power supply. The surplus power [w] is a power amount that becomes surplus after the backup power amount is secured in the secondary power supply. The assist unit 44 calculates the surplus power [w] by the following equation (2).

$$\text{The surplus power } [w] = \text{the current power amount } [w] - \text{the backup power amount } [w] \tag{2}$$

The unit time power consumption amount [w/s] is the unit time power consumption amount of each device during the power assist. The unit time power consumption amount is actually measured, or is calculated based on the parameter sheet and the like of the maker.

The assist time [s] is a period during which the secondary power supply supplies power to the monitoring device in case of the power failure to subject the monitoring device to the power assist. The assist unit 44 calculates the assist time [s] by the following equation (3).

$$\text{The assist time } [s] = \text{the surplus power } [w] \div \text{the unit time power consumption amount } [w/s] \tag{3}$$

Note that the assist time is calculated as the maximum time. As described with reference to FIG. 11, when the workload becomes the workload threshold value or less and becomes the workload threshold value or less after being lowered by the hysteresis, the power assist of the assist unit 44 with respect to the monitoring device ends.

FIG. 13 is a diagram illustrating a configuration example of a power supply management table T4.

The power supply management table T4 is a table for managing the PSU 11, the battery 16, and the capacitor 12, which are used as the power supplies of the respective devices of the storage device 10. The power supply management table T4 has the items of the ID, the power supply name, the model number, the maximum power [w], the charging time [H], the current power amount [w], the backup power amount threshold value [w], the charging/discharging cycle lifetime [the number of times], and the number of times of current charging/discharging [the number of times].

In the item of the ID, the ID for identifying the power supply is stored.

In the item of the power supply name, the name of each of the PSU 11, the battery 16, and the capacitor 12, which are the power supplies is stored.

In the item of the model number, the model number of each power supply is stored.

In the item of the maximum power, the maximum power that can be outputted by each power supply is stored.

In the item of the charging time, the charging time of the chargeable power supply is stored.

In the item of the current power amount, the power amount that can be outputted by each power supply is stored.

In the item of the backup power amount threshold value, the threshold value of the backup power amount charged as the backup power supply by the battery 16 or the capacitor 12 is stored.

In the item of the charging/discharging cycle lifetime, the charging/discharging cycle lifetime as an index enabling charging/discharging until the battery 16 reaches its lifetime is stored.

In the item of the number of times of current charging/discharging, the number of times of current charging/discharging of the battery 16 is stored. Note that the number of times of current charging/discharging is set only to the battery 16.

Figure 14:
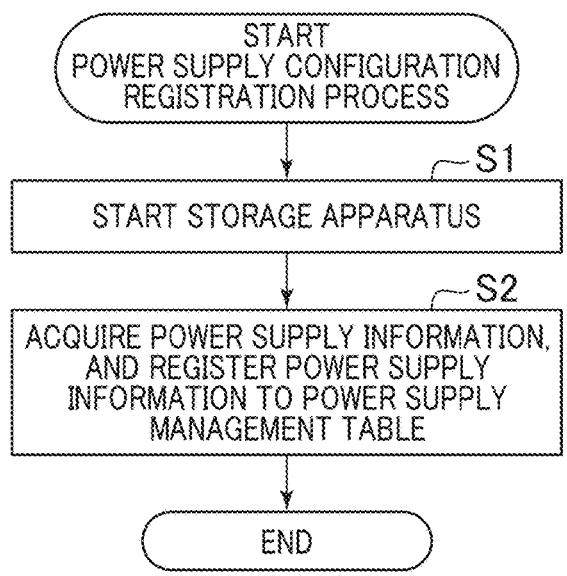
FIGS. 14(1) to 14(4) are flowcharts illustrating examples of various processes regarding secondary power supplies according to one embodiment of the invention.
Figure 14:
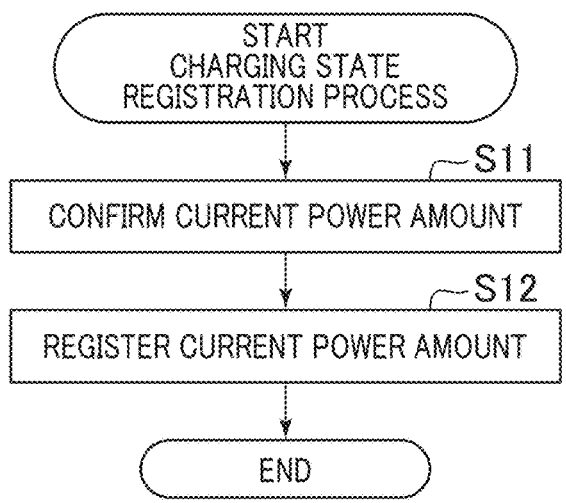
Figure 14:
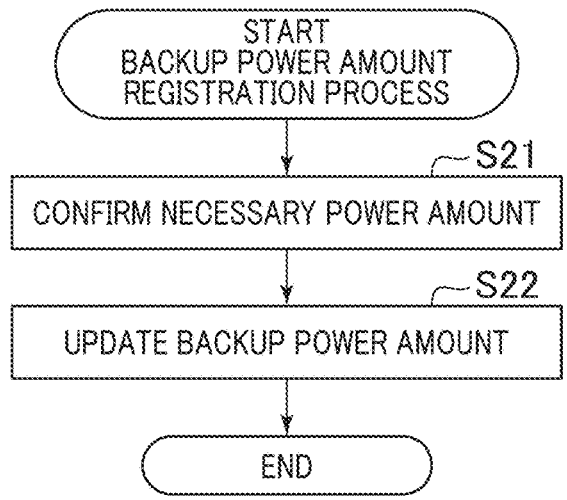
Figure 14:
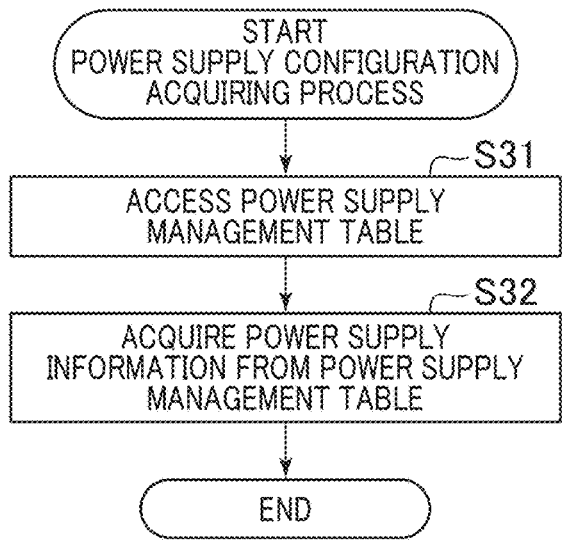

FIGS. 14(1) to 14(4) are flowcharts illustrating examples of various processes regarding the secondary power supplies. Here, the processes exploiting the features of the battery 16 and the capacitor 12, which are the secondary power supplies are performed. For example, the capacitor 12 has a small capacity but high responsiveness, and is thus used for instantaneous energy compensation. The battery 16 has a large capacity but low responsiveness, and is thus used for continued energy compensation. In the processes, other than the battery 16 and the capacitor 12, a non-AC power supply can also be used as an auxiliary power supply.

Flowchart of FIG. 14(1) illustrates an example of a power supply configuration registration process for registering the information of the mounted power supply at the start of the storage apparatus 10. The power assist controller 25 is required to be started until the storage apparatus 10 becomes in ready state, so that the start of the storage apparatus 10 and the start of the power assist controller 25 are performed at substantially the same timing. In the process illustrated in flowchart of FIG. 14(1), first, the storage apparatus 10 is started (S1). Next, the acquiring unit 41 illustrated in FIG. 12 acquires the power supply information, the registration unit 42 registers the power supply information to the power supply management table T4 (S2), and this process ends.

Flowchart of FIG. 14(2) illustrates an example of a charging state registration process for registering the charging state of each of the battery 16 and the capacitor 12. In this process, first, the monitoring unit 43 confirms the current power amount (S11). Next, the registration unit 42 registers the current power amount to the power supply management table T4 (S12), and this process ends.

Flowchart of FIG. 14(3) illustrates an example of a backup power amount registration process for updating the backup power amount of each of the battery 16 and the capacitor 12. In this process, first, the monitoring unit 43 confirms the necessary power amount (S21). Next, the registration unit 42 updates the backup power amount recorded to the power supply management table T4 (S22), and this process ends.

Flowchart of FIG. 14(4) illustrates an example of a power supply configuration acquiring process for acquiring the information of the power supply mounted in the storage apparatus 10. In this process, first, the acquiring unit 41 accesses the power supply management table T4 (S31). Next, the acquiring unit 41 acquires the power supply information from the power supply management table T4 (S32), and this process ends.

FIG. 15 is a diagram illustrating a configuration example of the configuration information table T5.

The configuration information table T5 has the items of the ID, the device name, the model number, and the unit time power consumption [w]. The items of the ID, the device name, and the model number are as described with reference to the power supply management table T4 of FIG. 13.

In the item of the unit time power consumption, the unit time power consumption amount is stored.

Figure 16:
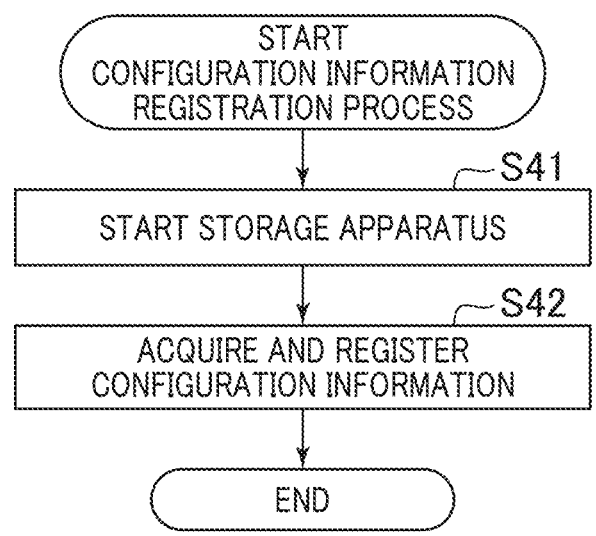
FIGS. 16(1) and 16(2) are flowcharts each illustrating an example of a process with respect to an assist target device according to one embodiment of the invention.
Figure 16:
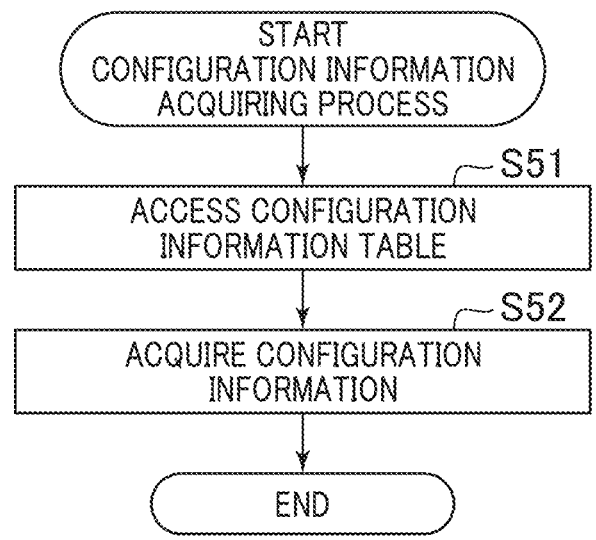

FIGS. 16(1) and 16(2) are flowcharts each illustrating an example of a process with respect to the assist target device. The assist target device is the device selected as the power assist target by the assist unit 44, among the respective portions illustrated in the per-device changing effect listing table T1 illustrated in FIG. 7.

The CPU, the DIMM, the encryption FPGA, the compression FPGA, the smart NIC, the BE switch, and the fan corresponding to the item of the portion illustrated in the per-device changing effect listing table T1 of FIG. 7 correspond to the assist target. In addition, the memory including the RAM and the like, not illustrated, the channel, and the drive (the SSD 18, the HDD, and the like) also correspond to the assist target. Further, the CPU core of the CPU 23 may be selected as the assist target.

Flowchart of FIG. 16(1) illustrates an example of a configuration information registration process for registering the information of each hardware configuring the storage apparatus 10 at the start of the storage apparatus 10. In this process, first, the storage apparatus 10 is started (S41). Next, the acquiring unit 41 acquires the configuration information, the registration unit 42 registers the configuration information to the configuration information table T5 (S42), and this process ends.

Flowchart of FIG. 16(2) illustrates an example of a configuration information acquiring process for acquiring the information of each hardware configuring the storage apparatus 10. In this process, first, the acquiring unit 41 accesses the configuration information table T5 (S51). Next, the acquiring unit 41 acquires the configuration information (S52), and this process ends.

FIG. 17 is a diagram illustrating a configuration example of the monitoring device table T6.

The monitoring device table T6 has the items of the ID, the monitoring device name, the model number, the power consumption [w], the workload threshold value, the hysteresis, and the current workload value. The items of the ID, the monitoring device name, and the model number are as described with reference to the power supply management table T4 of FIG. 13.

In the item of the power consumption [w], the power at the assist consumed at the assist to the monitoring device by the assist unit 44 is stored as the power consumption.

In the item of the workload threshold value, the workload threshold value set to each monitoring device is stored.

In the item of the hysteresis, the hysteresis set to each monitoring device is stored.

In the item of the current workload value, the current workload value of the monitoring device is stored.

Figure 18:
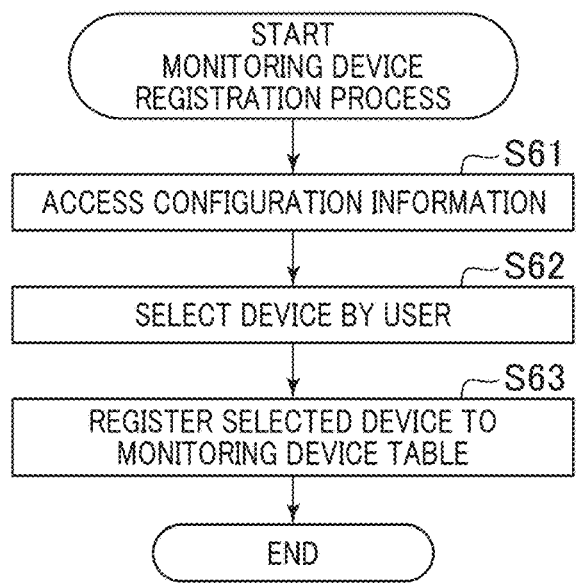
FIGS. 18(1) to 18(5) are diagrams each illustrating an example of the registration process of the monitoring device and a workload value according to one embodiment of the invention.
Figure 18:
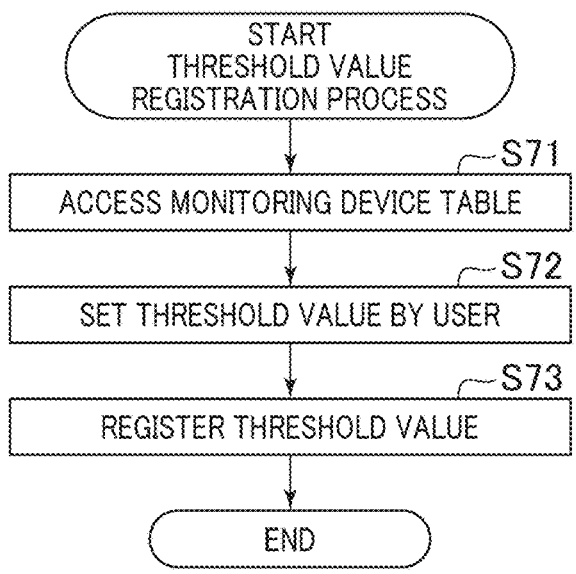
Figure 18:
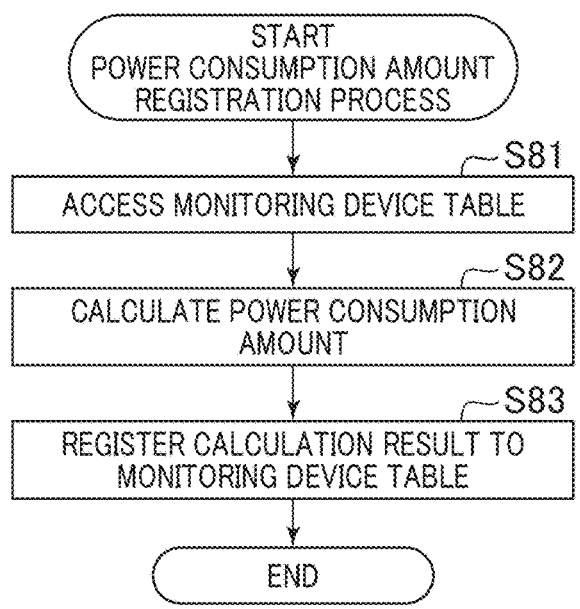
Figure 18:
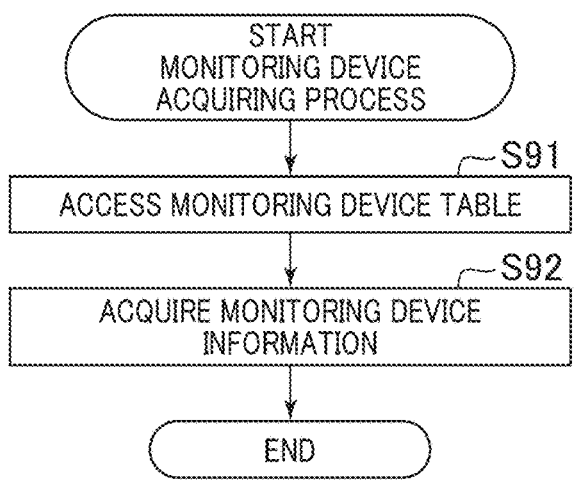
Figure 18:
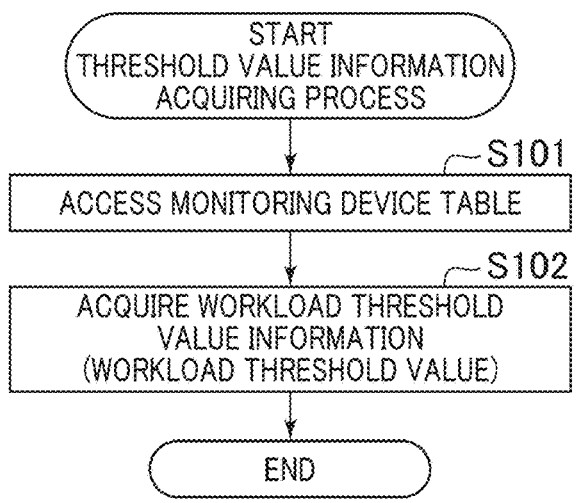

FIGS. 18(1) to 18(5) each illustrate an example of the registration process of the monitoring device and the workload value. As the reason why the workload value is monitored and the monitoring device is assisted, for example, the elimination of the increase in the load of the storage apparatus 10 is given. Accordingly, as the workload in which the workload is monitored as the processing load, for example, a compression process by the accelerator 29 and a data recovery process, correction copy, and an original and duplicate synchronous process by the CPU 23 are present.

In addition, in the fallback process at the failure of the storage apparatus 10, the fan 31 is rotated at high speed for immediately cooling each device, so that the power supplied to the fan 31 is increased. Note that the IO process, the PP process (task), and the like of the BE switch 28 may also be monitored.

Flowchart of FIG. 18(1) illustrates a monitoring device registration process by which the power assist controller 25 registers the monitoring target device to the monitoring device table T6 based on the operation mode selected by the user.

In this process, first, the registration unit 42 accesses the configuration information of the monitoring device (S61). Next, the monitoring device is selected by the user (S62). Next, the registration unit 42 registers, as the monitoring device, the device selected by the user (S63), and this process ends.

Flowchart of FIG. 18(2) illustrates an example of a threshold value registration process for registering the workload threshold value of the monitoring device by user setting and the like. In this process, first, the registration unit 42 accesses the monitoring device table T6 (S71). Next, the workload threshold value is set by the user (S72). Next, the registration unit 42 registers the workload threshold value set by the user to the monitoring device table T6(S73), and this process ends.

Flowchart of FIG. 18(3) illustrates an example of a power consumption amount registration process for registering the power consumption amount per unit time of the monitoring device. In this process, first, the registration unit 42 accesses the monitoring device table T6 (S81). Next, the registration unit 42 calculates the power consumption amount of the monitoring device (S82). Next, the registration unit 42 registers, to the monitoring device table T6, the power consumption amount of the monitoring device that is the calculation result (S83), and this process ends.

Flowchart of FIG. 18(4) illustrates an example of a monitoring device information acquiring process for acquiring the information of the monitoring device that is the target of the power assist process. In this process, first, the acquiring unit 41 accesses the monitoring device table T6 (S91). Next, the acquiring unit 41 acquires the monitoring device information from the monitoring device table T6 (S92), and this process ends.

Flowchart of FIG. 18(5) illustrates an example of a threshold value information acquiring process for acquiring the threshold value information of the monitoring device. In this process, first, the acquiring unit 41 accesses the monitoring device table T6 (S101). Next, the acquiring unit 41 acquires the threshold value information (for example, the workload threshold value) from the monitoring device table T6 (S102), and this process ends.

Note that in addition to the registration process for each single monitoring device illustrated in each of flowcharts of FIGS. 18(1) to 18(5), a plurality of monitoring devices corresponding to the operation mode selected by the user may be collectively registered by setting a multiple assist mode function. The user (including the system engineer) is difficult to register the monitoring device unless he/she understands the configuration and the operation of each device configuring the storage apparatus 10. For this, the power assist controller 25 selects, as the monitoring device, the device suitable for the operation mode selected by the user.

As illustrated in FIG. 10, when the IO process assist mode is selected, the power assist controller 25 collectively registers, as the monitoring devices, the CPU 23, the DIMM, the smart NIC 22, the BE switch 28, and the encryption FPGA 27 to the monitoring device table T6. By such the process of the power assist controller 25, the operations of the plurality of monitoring devices are collectively monitored.

Figure 19:
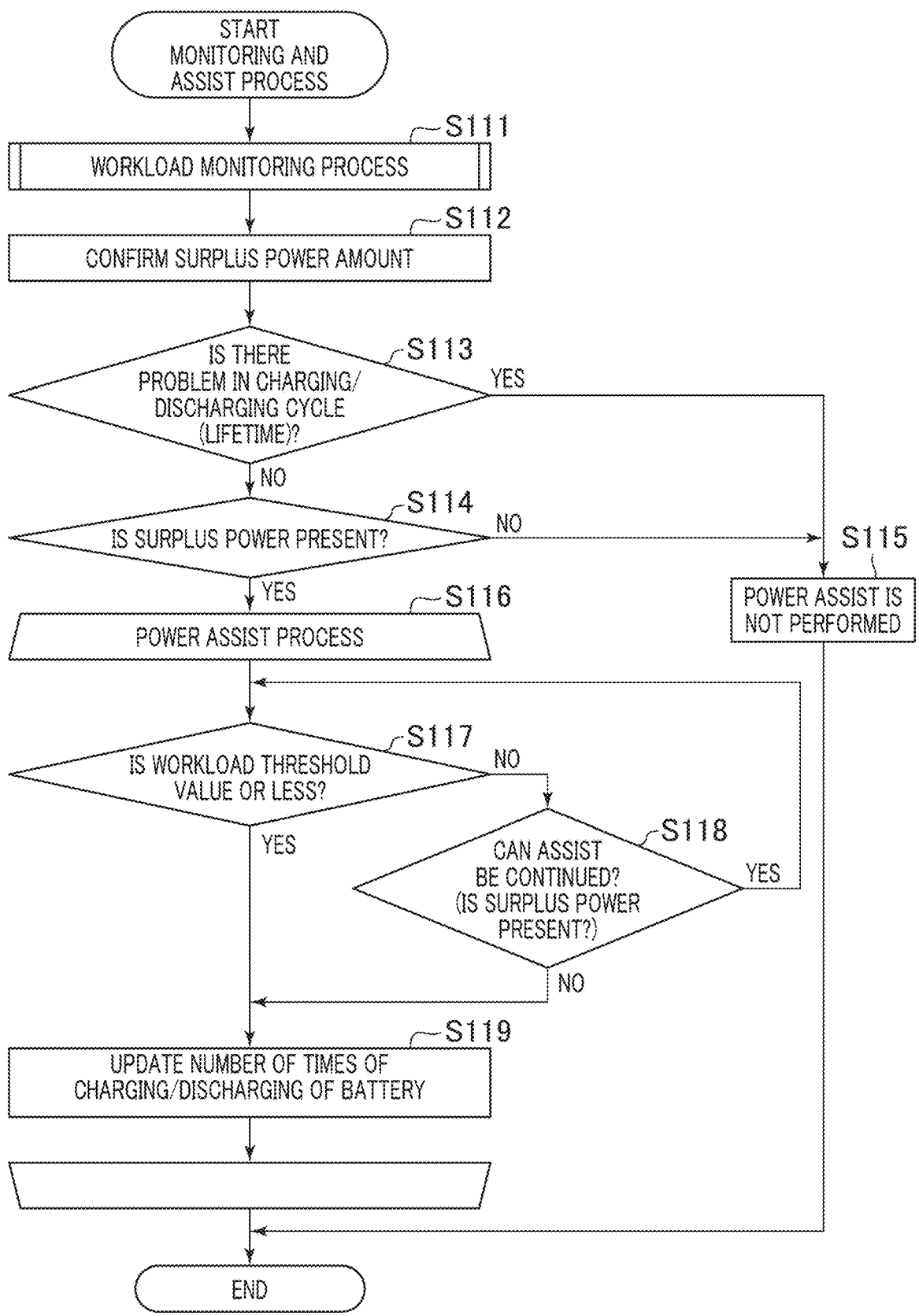
FIG. 19 is a flowchart illustrating an example of a monitoring and power assist process with respect to the monitoring device according to one embodiment of the invention.

FIG. 19 is a flowchart illustrating an example of a monitoring and power assist process with respect to the monitoring device. In this process, the monitoring target device is registered by user setting and the like, and whether or not the power assist process is required is judged. As the workload of the monitoring device, for example, the operation rate is given. The operation rate includes the system operation rate, the CPU operation rate, the CPU core operation rate, and the like.

In addition, as the workload of the monitoring device, for example, the IO process per second by the monitoring device is given. The IO process includes, in addition to random access and sequential access, writing and reading processes. In addition, as the workload of the monitoring device, for example, the task amount of the monitoring device is given. As the task, various task types, task processing time, a task multiplicity degree, and the like are included.

First, the monitoring unit 43 performs the workload monitoring process (S111). When the workload exceeds the workload threshold value, the judging process of the power assist process is performed. For this, next, the monitoring unit 43 confirms the surplus power amount (S112). The surplus power amount is calculated by subtracting the backup power amount from the current power amount. The surplus power amount is confirmed in order for the backup power amount to remain.

Next, the monitoring unit 43 refers to the power supply management table T4 of FIG. 13 to judge whether or not there is a problem in the charging/discharging cycle (lifetime) of the battery 16 (S113). In consideration of the lifetime, that is, the useful life in years of the battery 16, this process is performed for judging whether or not the monitoring device may be subjected to the power assist. When there is a problem in the charging/discharging cycle (lifetime) (YES of S113), the monitoring unit 43 judges that the monitoring device is not subjected to the power assist (S115), and ends this process.

On the other hand, when there is not a problem in the charging/discharging cycle (lifetime) (NO of S113), the monitoring unit 43 judges whether or not the surplus power is present in the battery 16 (S114). When the surplus power is not present in the battery 16 (NO of S114), the monitoring unit 43 judges that the monitoring device is not subjected to the power assist (S115), and ends this process.

On the other hand, when the surplus power is present in the battery 16 (YES of S114), the assist unit 44 starts the power assist process (S116). The power assist process is continued until the workload of the monitoring device becomes the workload threshold value or less or the surplus power of the battery 16 is lost. For this, in the power assist process, the assist unit 44 judges whether or not the workload of the monitoring device is the workload threshold value or less (S117). When the workload is the workload threshold value or less (YES of S117), the assist unit 44 updates the number of times of charging/discharging of the battery 16 (S119), and ends the power assist process. The number of times of charging/discharging of the battery 16 is stored in, for example, the DRAM 26.

On the other hand, when the workload exceeds the workload threshold value (NO of S117), the assist unit 44 judges whether or not the power assist process can be continued (S118). Whether or not the power assist process can be continued is judged according to whether or not the surplus power is present in the battery 16. When the assist unit 44 judges that the power assist process can be continued (YES of S118), the process returns to S117 in a state where the power assist process of step S116 is continued, to continue the comparison of the workload and the workload threshold value.

On the other hand, when the assist unit 44 judges that the power assist process cannot be continued (NO of S118), the charging of the battery 16 is required to be restarted since the surplus power of the battery 16 is not present even when the workload of the monitoring device exceeds the workload threshold value. For this, the assist unit 44 stops the power assist process, updates the number of times of charging/discharging of the battery 16 (S119), exits the loop of the power assist process of the monitoring device, and ends this process. Thereafter, the charging of the battery 16 is restarted.

Figure 20:
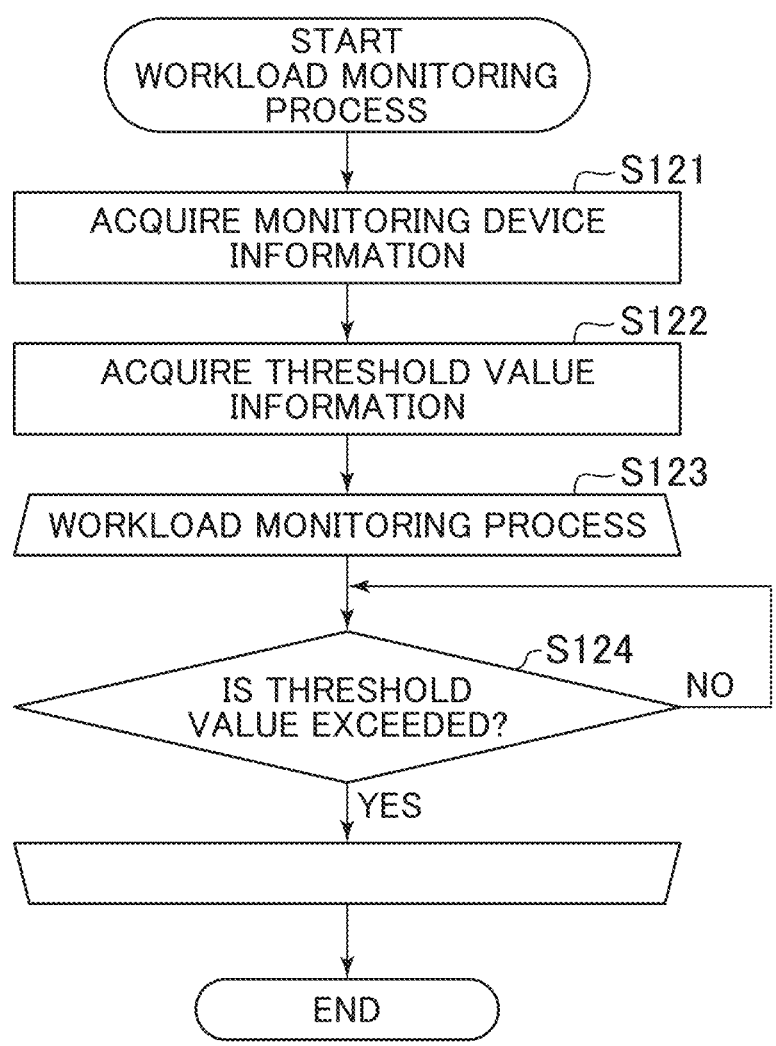
FIG. 20 is a flowchart illustrating an example of a workload monitoring process according to one embodiment of the invention.

FIG. 20 is a flowchart illustrating an example of the workload monitoring process of step S111. In the workload monitoring process, the workload is monitored with respect to the monitoring device as the monitoring target registered by user setting and the like.

First, the monitoring unit 43 acquires the monitoring device information (for example, the monitoring device name) from the monitoring device table T6 (S121). Next, the monitoring unit 43 acquires the threshold value information from the monitoring device table T6 (S122). The threshold value information includes the workload threshold value, the hysteresis, and the current workload value.

Next, the monitoring unit 43 performs the workload monitoring process (S123). In the workload monitoring process, it is judged whether or not the current workload value exceeds the workload threshold value (S124). When the current workload value does not exceed the workload threshold value (NO of S124), the monitoring of the current workload value is subsequently continued by the process of step S124.

On the other hand, when it is judged that the current workload value exceeds the workload threshold value (YES of S124), the workload monitoring process is ended, and the process is returned to step S112 of FIG. 19.

Figure 21:
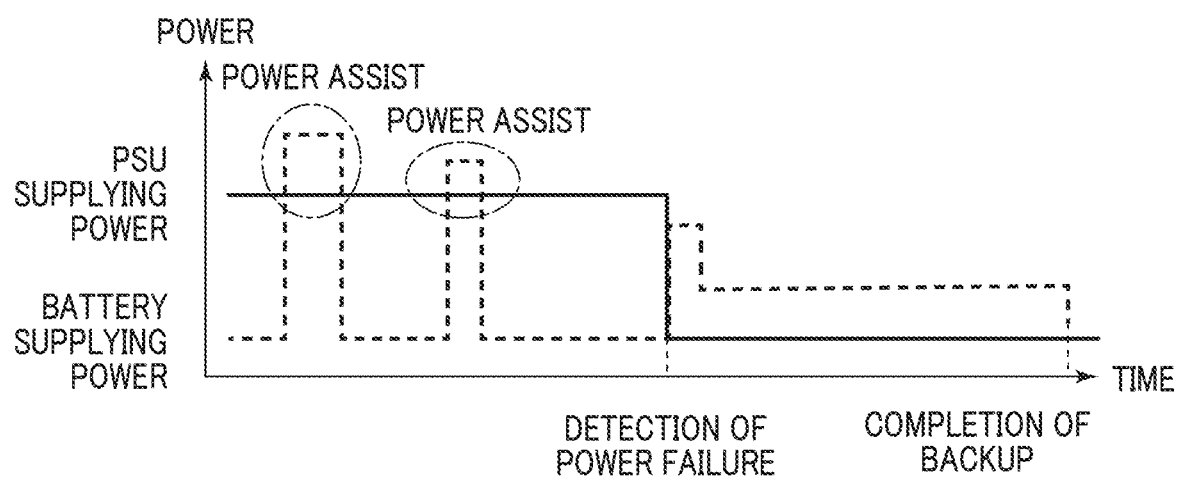
FIG. 21 is a diagram illustrating a state where the power assist controller performs power assist according to one embodiment of the invention.

FIG. 21 is a diagram illustrating a state where the power assist controller 25 performs the power assist. In FIG. 21, the horizontal axis indicates time, and the vertical axis indicates power.

The PSU supplying power indicates power obtained by adding the maximum powers of the two PSUs 11. When the workload of the monitoring device exceeds the workload threshold value, the power assist controller 25 increases the battery supplying power at the timing surrounded by the dashed and dotted line in the drawing even before the detection of the power failure, in order to subject the monitoring device to the power assist.

The operation of the monitoring device is made faster by this power assist, and the workload of the monitoring device becomes less than the workload threshold value. When the power assist controller 25 detects the power failure, the power assist controller 25 lowers the PSU supplying power to increase the battery supplying power. The operation of switching the monitoring device to the power saving operation is the same as the conventional power control described with reference to FIG. 2.

The power assist controller 25 according to one embodiment described above performs monitoring by comparing the workload of each device selected as the monitoring target with the workload threshold value. With respect to the device whose workload exceeds the workload threshold value, the power assist controller 25 performs the power assist supplying, to the device, the surplus power of the capacitor 12 or the battery 16 as the secondary power supply even before the detection of the power failure. By this power assist, power larger than the power supplied to the storage controller 13 by the PSU 11 is given. For this, the processing performance of the device whose workload exceeds the workload threshold value can be enhanced.

The battery 16 that has been conventionally used only in case of the power failure can be used even when the power failure does not occur. For this, the surplus power stored in the battery 16 that is expensive and has a large capacity can be effectively used.

In addition, the power supplied from the secondary battery to the device by the power assist is the surplus power obtained by subtracting the backup power amount from the current power amount. For this, the backup power amount is not reduced in the power assist, and even when the power failure occurs during the power assist, the backup power is supplied to the device, so that the backup of the device is safely performed.

In addition, the power assist controller 25 performs the power assist process based on the useful life in years and the backup power amount of the secondary power supply. The useful life in years is judged according to the charging/discharging cycle (lifetime), and when there is not a problem in the charging/discharging cycle (lifetime), the power assist for the monitoring device is performed, and when there is a problem in the charging/discharging cycle (lifetime), the power assist for the monitoring device is not performed. For this, when there is a problem in the charging/discharging cycle (lifetime), there is no fear of the deterioration of the performance of the secondary power supply due to the power assist.

Note that the invention is not limited to the above embodiment, and needless to say, other various application examples and modification examples can be taken unless they deviate from the purport of the invention described in the scope of claims.

For example, the above embodiment has described the configuration of the system in detail and specifically in order to simply describe the invention, and is not necessarily required to include all the described configurations. In addition, part of the configuration of this embodiment can also be subjected to addition, deletion, and replacement with respect to other configurations.

In addition, any control line and any information line that are considered to be necessary for the description are represented, and all the control lines and the information lines are not always represented for the product. It may be considered that almost all of the configurations are actually mutually connected.

What is claimed is:

1. A storage apparatus including a power control unit that monitors the load of a monitoring device selected as a power assist target device, wherein
the power control unit has:
a monitoring unit that monitors the load of the monitoring device; and
an assist unit that assists the monitoring device by supplying surplus power to the monitoring device until the load becomes a load threshold value or less when the surplus power remains in an electricity storing unit and the load exceeds the load threshold value, wherein
the assist unit supplies the surplus power to the monitoring device selected according to a characteristic of the electricity storing unit
the assist unit supplies, to the monitoring device, the surplus power of the electricity storing unit selected according to the characteristic of the electricity storing unit by on or off of a power control element provided to a power supply wire between the electricity storing unit and the monitoring device,
the monitoring unit selects a plurality of monitoring devices according to a selected mode, the assist unit collectively supplies the surplus power to the plurality of monitoring devices according to the selected mode,
the assist unit selects, from the plurality of monitoring devices, the monitoring device to which the surplus power is supplied, according to the state of the load of the monitoring device,
the power control unit has:
an acquiring unit that acquires configuration information of the device configuring the storage apparatus; and a registration unit that registers, to a monitoring device table, information of the monitoring device selected from a configuration information table based on the acquired configuration information, the registration unit registers the plurality of monitoring devices to the monitoring device table according to the selected mode, and the monitoring unit monitors the loads of the plurality of monitoring devices that is read from the monitoring device table according to the selected mode, and the assist unit calculates the surplus power by subtracting a backup power amount from a current power amount, and calculates assist time by dividing the surplus power by a unit time power consumption amount.

2. A power supplying method by which the load of a monitoring device selected as a power assist target device is monitored comprising:

a step of monitoring, by a monitoring unit, the load of the monitoring device; and a step of assisting, by an assist unit, the monitoring device by supplying surplus power to the monitoring device until the load becomes a load threshold value or less when the surplus power remains in an electricity storing unit and the load exceeds the load threshold value, wherein the assist unit supplies the surplus power to the monitoring device selected according to a characteristic of the electricity storing unit the assist unit supplies, to the monitoring device, the surplus power of the electricity storing unit selected according to the characteristic of the electricity storing unit by on or off of a power control element provided to a power supply wire between the electricity storing unit and the monitoring device, the monitoring unit selects a plurality of monitoring devices according to a selected mode, the assist unit collectively supplies the surplus power to the plurality of monitoring devices according to the selected mode, the assist unit selects, from the plurality of monitoring devices, the monitoring device to which the surplus power is supplied, according to the state of the load of the monitoring device, the power control unit has:

an acquiring unit that acquires configuration information of the device configuring the storage apparatus; and a registration unit that registers, to a monitoring device table, information of the monitoring device selected from a configuration information table based on the acquired configuration information, the registration unit registers the plurality of monitoring devices to the monitoring device table according to the selected mode, and the monitoring unit monitors the loads of the plurality of monitoring devices that is read from the monitoring device table according to the selected mode, and the assist unit calculates the surplus power by subtracting a backup power amount from a current power amount, and calculates assist time by dividing the surplus power by a unit time power consumption amount.

3. A non-transitory computer readable storage medium storing a program for monitoring the load of a monitoring device selected as a power assist target device and supplying the surplus power of an electricity storing unit to the monitoring device when the load exceeds a load threshold value, the program causing a computer to execute:

a procedure for monitoring, by a monitoring unit, the load of the monitoring device; and a procedure for assisting, by an assist unit, the monitoring device by supplying the surplus power to the monitoring device until the load becomes the load threshold value or less when the surplus power remains in the electricity storing unit and the load exceeds the load threshold value, wherein the assist unit supplies the surplus power to the monitoring device selected according to a characteristic of the electricity storing unit the assist unit supplies, to the monitoring device, the surplus power of the electricity storing unit selected according to the characteristic of the electricity storing unit by on or off of a power control element provided to a power supply wire between the electricity storing unit and the monitoring device, the monitoring unit selects a plurality of monitoring devices according to a selected mode, the assist unit collectively supplies the surplus power to the plurality of monitoring devices according to the selected mode, the assist unit selects, from the plurality of monitoring devices, the monitoring device to which the surplus power is supplied, according to the state of the load of the monitoring device, the power control unit has:

an acquiring unit that acquires configuration information of the device configuring the storage apparatus; and a registration unit that registers, to a monitoring device table, information of the monitoring device selected from a configuration information table based on the acquired configuration information, the registration unit registers the plurality of monitoring devices to the monitoring device table according to the selected mode, and the monitoring unit monitors the loads of the plurality of monitoring devices that is read from the monitoring device table according to the selected mode, and the assist unit calculates the surplus power by subtracting a backup power amount from a current power amount, and calculates assist time by dividing the surplus power by a unit time power consumption amount.

* * * * *